(12) United States Patent
Noguchi et al.

(10) Patent No.: US 11,345,365 B2
(45) Date of Patent: May 31, 2022

(54) CONTROL DEVICE, GETTING-INTO/OUT FACILITY, CONTROL METHOD, AND STORAGE MEDIUM

(71) Applicant: HONDA MOTOR CO., LTD., Tokyo (JP)

(72) Inventors: Junpei Noguchi, Wako (JP); Chie Sugihara, Tokyo (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/871,089

(22) Filed: May 11, 2020

(65) Prior Publication Data
US 2020/0385016 A1 Dec. 10, 2020

(30) Foreign Application Priority Data
May 24, 2019 (JP) .............................. JP2019-097687

(51) Int. Cl.
*E04H 6/42* (2006.01)
*B60W 60/00* (2020.01)
(Continued)

(52) U.S. Cl.
CPC ....... *B60W 60/001* (2020.02); *G01C 21/3626* (2013.01); *G01C 21/3679* (2013.01);
(Continued)

(58) Field of Classification Search
CPC ..... B60W 60/001; G08G 1/149; G08G 1/142; G08G 1/146; G08G 1/148; G01C 21/3679;
(Continued)

(56) References Cited

U.S. PATENT DOCUMENTS

| 2019/0243368 A1* | 8/2019 | Seki ..................... G05D 1/0011 |
| 2020/0160710 A1* | 5/2020 | Obayashi ................ H04W 4/33 |
| 2020/0207334 A1* | 7/2020 | Cho ................... B62D 15/0285 |

FOREIGN PATENT DOCUMENTS

| CN | 108399783 | 8/2018 |
| CN | 111986505 | 11/2020 |

(Continued)

OTHER PUBLICATIONS

Self-Automated Parking Lots for Autonomous Vehicles based on Vehicular Ad Hoc Networking 2014 IEEE Intelligent Vehicles Symposium (IV) Jun. 8-11, 2014. Dearborn, Michigan, USA to Damas et al. (Year: 2014).*

(Continued)

*Primary Examiner* — Kenneth J Malkowski
(74) *Attorney, Agent, or Firm* — Amin, Turocy & Watson, LLP

(57) ABSTRACT

A control device includes a getting-into/out facility selection unit configured to select one or more getting-into/out facilities where a vehicle to be parked in a parking lot will stop from among a plurality of getting-into/out facilities on the basis of at least information indicating a driving assistance level at which driving assistance can be executed by the vehicle and information associated with the parking lot having the plurality of getting-into/out facilities and a guidance unit configured to guide the vehicle to the selected getting-into/out facility.

11 Claims, 15 Drawing Sheets

(51) Int. Cl.
  *G08G 1/14* (2006.01)
  *G01C 21/36* (2006.01)
  *E04H 6/10* (2006.01)

(52) U.S. Cl.
  CPC .............. *G08G 1/142* (2013.01); *G08G 1/149* (2013.01); *E04H 6/10* (2013.01)

(58) Field of Classification Search
  CPC .. G01C 21/3626; G01C 21/3685; E04H 6/10; E04H 6/422; E04H 6/426; E04H 6/424
  See application file for complete search history.

(56) References Cited

FOREIGN PATENT DOCUMENTS

| | | | |
|---|---|---|---|
| JP | 2013-015453 | 1/2013 | |
| JP | 2018-145655 | 9/2018 | |
| WO | WO-2018096985 A1 * | 5/2018 | ............... E04H 6/00 |

OTHER PUBLICATIONS

Chinese Office Action for Chinese Patent Application No. 202010422086.2 dated Dec. 15, 2021.

* cited by examiner

| GETTING-INTO/OUT FACILITY | DIFFICULTY LEVEL |
|---|---|
| STOPPING AREA 310-1 | MEDIUM |
| STOPPING AREA 310-2 | HIGH |
| STOPPING AREA 310-3 | MEDIUM |
| STOPPING AREA 310-4 | LOW |
| STOPPING AREA 310-5 | LOW |

CONTROL DEVICE, GETTING-INTO/OUT FACILITY, CONTROL METHOD, AND STORAGE MEDIUM

CROSS-REFERENCE TO RELATED APPLICATION

Priority is claimed on Japanese Patent Application No. 2019-097687, filed May 24, 2019, the content of which is incorporated herein by reference.

BACKGROUND OF THE INVENTION

Field of the Invention

The present invention relates to a control device, a getting-into/out facility, a control method, and a storage medium.

Description of Related Art

In recent years, research has been conducted on automatedly controlling vehicles. In relation to this research, technology for providing a parking service using a parking lot including a stopping area (a parking area) and a getting-into/out area has been disclosed (for example, Japanese Unexamined Patent Application, First Publication No. 2018-145655 (hereinafter referred to as Patent Document 1)). In Patent Document 1, a case in which a getting-into/out area where a getting-out area and a getting-into area are integrated is provided and whether the getting-into/out area function as the getting-out area or functions as the getting-into area is changed in accordance with a frequency of use is shown.

SUMMARY OF THE INVENTION

However, in the conventional technology, a possibility that a required time period (a time period required for the user to get into or out of a vehicle) in a getting-into/out facility including a getting-out area and a getting-into area depending on the performance of the vehicle may greatly differ according to each vehicle is not sufficiently taken into account and congestion of the getting-into/out facility may be likely to be caused when vehicles are not appropriately guided.

Aspects according to the present invention have been made in view of such circumstances and an objective of the present invention is to provide a control device, a getting-into/out facility, a control method, and a storage medium capable of preventing a getting-into/out facility from becoming congested.

In order to achieve the objective by solving the above-described problems, the present invention adopts the following aspects.

(1): According to an aspect of the present invention, there is provided a control device including: a getting-into/out facility selection unit configured to select one or more getting-into/out facilities where a vehicle to be parked in a parking lot will stop from among a plurality of getting-into/out facilities on the basis of at least information indicating a driving assistance level at which driving assistance can be executed by the vehicle and information associated with the parking lot having the plurality of getting-into/out facilities; and a guidance unit configured to guide the vehicle to the selected getting-into/out facility.

(2): In the above-described aspect (1), the getting-into/out facility selection unit may select the getting-into/out facility in response to a leaving request for causing the vehicle to automatedly move from a stop position of the vehicle to the getting-into/out facility.

(3): In the above-described aspect (1) or (2), the getting-into/out facility selection unit may select the getting-into/out facility when the vehicle is allowed to enter the parking lot.

(4): In the above-described aspect (3), the getting-into/out facility selection unit may select a getting-into/out facility having a higher stopping difficulty level when the driving assistance level is higher.

(5): In the above-described aspect (3) or (4), the getting-into/out facility selection unit may select a getting-into/out facility having a higher stopping difficulty level when the driving assistance level is higher than or equal to a reference level than when the driving assistance level is lower than the reference level.

(6): In the above-described aspect (5), the control device may further include a recognition level setting unit configured to set a recognition level representing a recognition accuracy level of the vehicle, wherein the getting-into/out facility selection unit may select a getting-into/out facility having a higher stopping difficulty level than the getting-into/out facility selected in a situation in which the recognition level of the vehicle is lower than a first level when the driving assistance level is higher than or equal to the first level and lower than a second level higher than the first level, and wherein the getting-into/out facility selection unit may select a getting-into/out facility having a higher stopping difficulty level than the getting-into/out facility selected in a situation in which the recognition level of the vehicle is higher than or equal to the first level and lower than the second level when the recognition level of the vehicle is higher than or equal to the second level.

(7): In the above-described aspect (6), the recognition level setting unit may set the recognition level on the basis of a level at which the vehicle can autonomously travel without accompanying a driving operation of a user of the vehicle, and the getting-into/out facility selection unit may select the getting-into/out facility on the basis of the recognition level set on the basis of the level at which the vehicle can autonomously travel.

(8): In any one of the above-described aspects (4) to (7), the getting-into/out facility selection unit may set the stopping difficulty level in accordance with an extra space in a vehicle length direction required when the vehicle is parallel parked in the selected getting-into/out facility and select the getting-into/out facility on the basis of the set stopping difficulty level.

(9): In any one of the above-described aspects (1) to (8), the control device may further include a stopping difficulty level setting unit configured to set information associated with a stopping difficulty level of the getting-into/out facility, wherein the getting-into/out facility selection unit may select the getting-into/out facility where a host vehicle can stop and which has a higher stopping difficulty level from among the getting-into/out facilities in an empty state on the basis of a setting result of the stopping difficulty level setting unit and a recognition level of the host vehicle.

(10): According to an aspect of the present invention, there is provided a getting-into/out facility where a user of a vehicle gets into or out of the vehicle at a position away from a parking space of the vehicle in a parking lot, wherein the parking lot includes a plurality of getting-into/out facilities having different stopping difficulty levels, and wherein the vehicle or the user is allowed to use the getting-into/out facility according to a level at which surroundings of the vehicle can be recognized when the vehicle enters the parking lot and the vehicle is allowed to be parked in the parking lot associated with the getting-into/out facility after the getting-into/out facility is used.

(11): According to an aspect of the present invention, there is provided a control method including: selecting, by a computer, one or more getting-into/out facilities where a vehicle to be parked in a parking lot will stop from among a plurality of getting-into/out facilities on the basis of at least information indicating a driving assistance level at which driving assistance can be executed by the vehicle and information associated with the parking lot having the plurality of getting-into/out facilities in response to a leaving request for causing the vehicle to automatedly move from a parking position to the getting-into/out facility; and guiding, by the computer, the vehicle to the selected getting-into/out facility.

(12): According to an aspect of the present invention, there is provided a computer-readable non-transitory storage medium storing a program for causing a computer to: select one or more getting-into/out facilities where a vehicle to be parked in a parking lot will stop from among a plurality of getting-into/out facilities on the basis of at least information indicating a driving assistance level at which driving assistance can be executed by the vehicle and information associated with the parking lot having the plurality of getting-into/out facilities in response to a leaving request for causing the vehicle to automatedly move from a parking position to the getting-into/out facility; and guide the vehicle to the selected getting-into/out facility.

According to the above-described aspects (1) to (12), it is possible to mitigate congestion of a getting-into/out facility by guiding a vehicle to the getting-into/out facility according to the vehicle.

DETAILED DESCRIPTION OF THE INVENTION

Hereinafter, embodiments of a control device, a getting-into/out facility, a control method, and a storage medium according to the present invention will be described with reference to the drawings. Although a case in which left-hand traffic regulations are applied will be described, it is only necessary to reverse the left and right when right-hand traffic regulations are applied.

First Embodiment

A control device according to a first embodiment will be mainly described as a device for performing wired or wireless communication with a parking lot management device configured to manage various types of vehicles using a parking lot.

[Example of Overall Configuration of Vehicle System 1]

Figure 1:
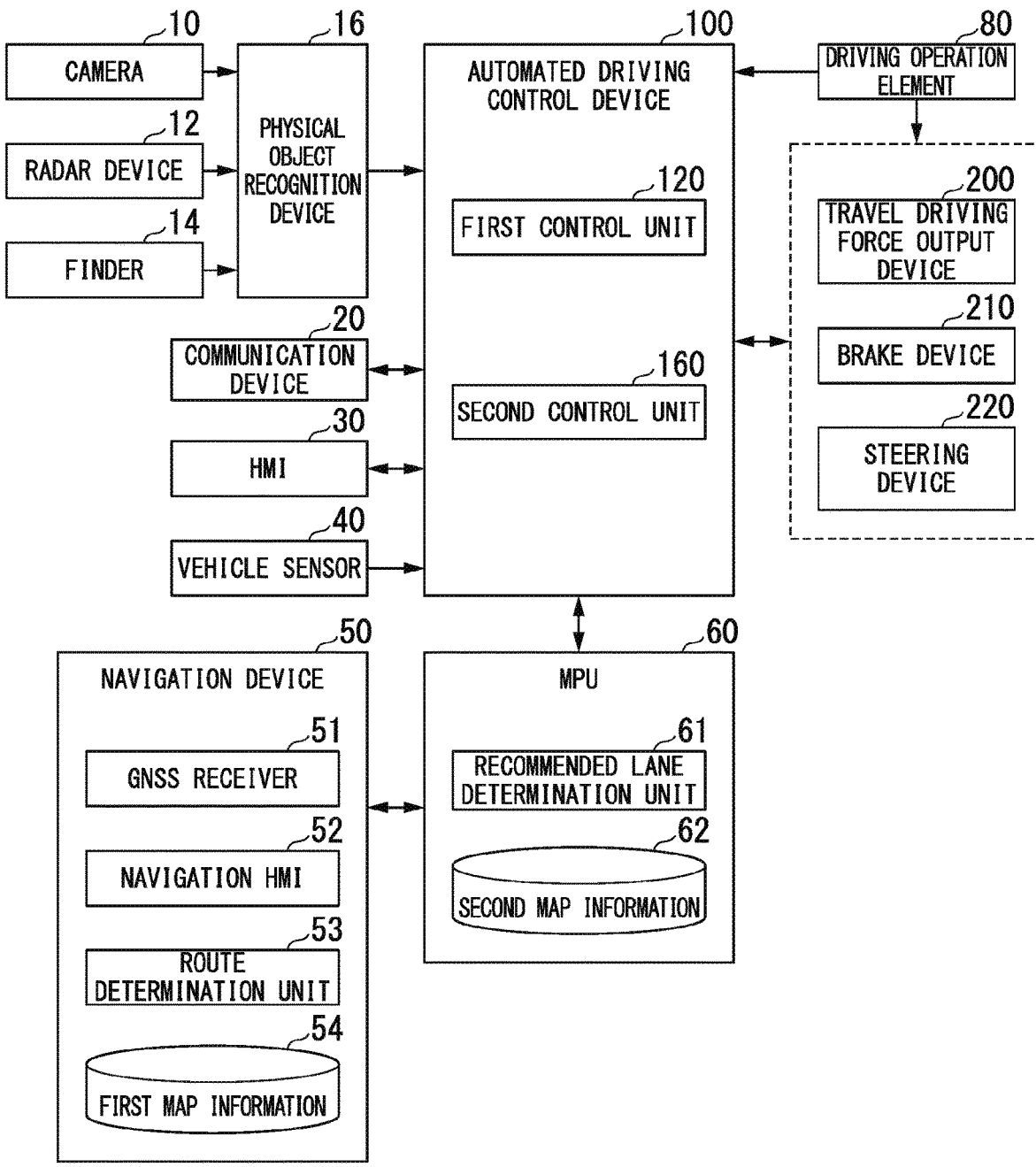
FIG. 1 is a configuration diagram of a vehicle system 1 including a vehicle control device.

FIG. 1 is a configuration diagram of a vehicle system 1 including a vehicle control device. For example, a vehicle in which the vehicle system 1 is mounted (hereinafter referred to as a vehicle M) is, for example, a two-wheeled vehicle, a three-wheeled vehicle, or a four-wheeled vehicle. A driving source of the vehicle M is an internal combustion engine such as a diesel engine or a gasoline engine, an electric motor, or a combination thereof. The electric motor is operated using electric power generated by an electric power generator connected to the internal combustion engine or discharge electric power of a secondary battery or a fuel cell.

For example, the vehicle system 1 includes a camera 10, a radar device 12, a finder 14, a physical object recognition device 16, a communication device 20, a human machine interface (HMI) 30, a vehicle sensor 40, a navigation device 50, a map positioning unit (MPU) 60, a driving operation element 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. Also, the configuration shown in FIG. 1 is merely an example and parts of the configuration may be omitted or other configurations may be further added.

For example, the camera 10 is a digital camera using a solid-state imaging element such as a charge coupled device (CCD) or a complementary metal oxide semiconductor (CMOS). The camera 10 is attached to any position on the vehicle (hereinafter referred to as the vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any position on the vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the vehicle M and measures scattered light. The finder 14 detects a distance to an object on the basis of time from light emission to light reception. The radiated light is, for example, pulsed laser light. The finder 14 is attached to any position on the vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results of the camera 10, the radar device 12, and the finder 14 to the automated driving control device 100 as they are. The physical object recognition device 16 may be omitted from the vehicle system 1.

For example, the communication device 20 communicates with a terminal (hereinafter referred to as a user terminal T) used by a user U of the vehicle M, another vehicle present in the vicinity of the vehicle M, a parking lot management device (to be described below), or various types of server devices using, for example, a cellular network or a Wi-Fi network, Bluetooth (registered trademark), dedicated short range communication (DSRC), or the like.

The HMI 30 presents various types of information to an occupant of the vehicle M and receives an input operation of the occupant. The HMI 30 includes various types of display devices, a speaker, a buzzer, a touch panel, a switch, keys, and the like.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like.

For example, the navigation device 50 includes a global navigation satellite system (GNSS) receiver 51, a navigation HMI 52, and a route determination unit 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determination unit 53 determines a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of the terminal device (for example, the user terminal T) such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determination unit 61 and stores second map information 62 in a storage device such as an HDD or a flash memory. The recommended lane determination unit 61 divides the route on the map provided from the navigation device 50 into a plurality of blocks (for example, divides the route every 100 [m] in a traveling direction of the vehicle), and determines a recommended lane for each block with reference to the second map information 62. The recommended lane determination unit 61 determines what number lane the vehicle travels in from the left. The recommended lane determination unit 61 determines the recommended lane so that the vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. Also, the second map information 62 may include road information, traffic regulations information, address information (an address/postal code), facility information, parking lot information, telephone number information, and the like. The second map information 62 may be updated at any time when the communication device 20 communicates with another device.

For example, the driving operation element 80 includes an accelerator pedal, a brake pedal, a shift lever, a steering wheel, a steering wheel variant, a joystick, and other operation elements. A sensor configured to detect an amount of operation or the presence or absence of an operation is attached to the driving operation element 80, and a detection result thereof is output to the automated driving control device 100 or some or all of the travel driving force output device 200, the brake device 210, and the steering device 220.

The automated driving control device 100 includes, for example, a first control unit 120 and a second control unit 160. The first control unit 120 and the second control unit 160 are implemented, for example, by a hardware processor such as a central processing unit (CPU) executing a program (software). Also, some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by software and hardware in cooperation. The program may be pre-stored in a storage device such as an HDD or a flash memory of the automated driving control device 100 (a storage device including a non-transitory storage medium) or may be stored in a removable storage medium such as a DVD or a CD-ROM and installed in the HDD or the flash memory of the automated driving control device 100 when the storage medium (the non-transitory storage medium) is mounted in a drive device.

Figure 2:
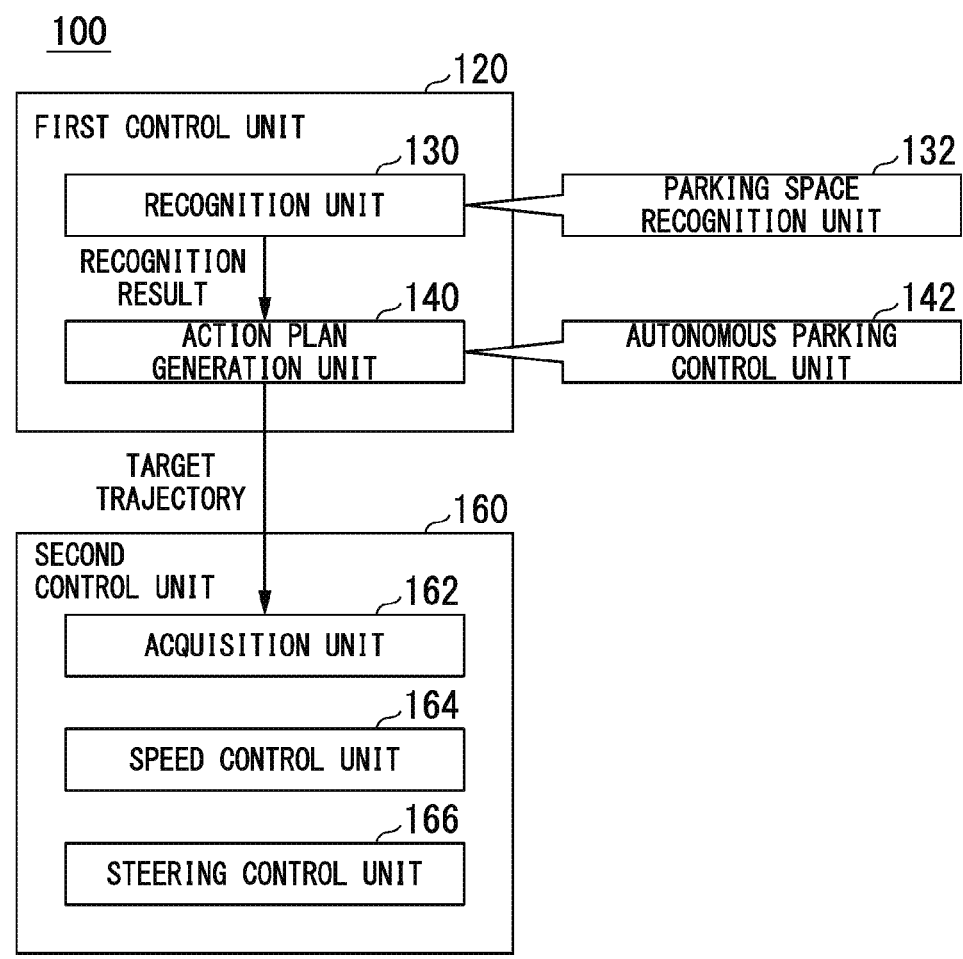
FIG. 2 is a functional configuration diagram of a first control unit 120 and a second control unit 160.

FIG. 2 is a functional configuration diagram of the first control unit 120 and the second control unit 160. The first control unit 120 includes, for example, a recognition unit 130 and an action plan generation unit 140. For example, the first control unit 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both recognitions. Thereby, the reliability of automated driving is secured.

The recognition unit 130 recognizes a state such as a position, velocity, or acceleration of a physical object present in the vicinity of the vehicle M on the basis of information input from the vehicle exterior camera 10, the radar device 12, and the finder 14 via the physical object recognition device 16. For example, the position of the physical object is recognized as a position on absolute coordinates with a representative point (a center of gravity, a driving shaft center, or the like) of the vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognition unit 130 recognizes a lane in which the vehicle M is traveling (a travel lane). For example, the recognition unit 130 recognizes the travel lane by comparing a pattern of a road dividing line (for example, an arrangement of solid lines and broken lines) obtained from the second map information 62 with a pattern of road dividing lines in the vicinity of the vehicle M recognized from an image captured by the camera 10. The recognition unit 130 may recognize a travel lane by recognizing a traveling path boundary (a road boundary) including a road dividing line, a road shoulder, a curb stone, a median strip, a guardrail, or the like as well as a road dividing line. In this recognition, a position of the vehicle M acquired from the navigation device 50 or a processing result of the INS may be added. The recognition unit 130 recognizes a temporary stop line, an obstacle, red traffic light, a toll gate, and other road events.

When the travel lane is recognized, the recognition unit 130 recognizes a position or orientation of the vehicle M with respect to the travel lane. For example, the recognition unit 130 may recognize a gap of a reference point of the vehicle M from the center of the lane and an angle formed with respect to a line connecting the center of the lane in the travel direction of the vehicle M as a relative position and orientation of the vehicle M related to the travel lane. Alternatively, the recognition unit 130 may recognize a position of the reference point of the vehicle M related to one side end portion (a road dividing line or a road boundary) of the travel lane or the like as a relative position of the vehicle M related to the travel lane.

The recognition unit 130 includes a parking space recognition unit 132 that is activated in an autonomous parking event to be described below. Details of a function of the parking space recognition unit 132 will be described below.

The action plan generation unit 140 generates a future target trajectory along which the vehicle M automatedly travels (independently of an operation of a driver) so that the vehicle M can generally travel in the recommended lane determined by the recommended lane determination unit 61 and further cope with a surrounding situation of the vehicle M. For example, the target trajectory includes a speed element. For example, the target trajectory is represented by sequentially arranging points (trajectory points) at which the vehicle M is required to arrive. The trajectory points are points at which the vehicle M is required to arrive for each predetermined traveling distance (for example, about several meters [m]) along a road. Separately, a target speed and target acceleration for each predetermined sampling time (for example, about several tenths of a second [sec]) are generated as parts of the target trajectory. Also, the trajectory point may be a position at which the vehicle M is required to arrive at the sampling time for each predetermined sampling time. In this case, information about the target speed or the target acceleration is represented by an interval between the trajectory points.

The action plan generation unit 140 may set an automated driving event when the target trajectory is generated. Automated driving events include a constant-speed traveling event, a low-speed following traveling event, a lane change event, a branching event, a merging event, a takeover event, an autonomous parking event in which a vehicle is parked according to unmanned traveling in valet parking or the like, and the like. The action plan generation unit 140 generates a target trajectory according to an activated event. The action plan generation unit 140 includes an autonomous parking control unit 142 that is activated when the autonomous parking event is executed. Details of a function of the autonomous parking control unit 142 will be described below.

The second control unit 160 controls the travel driving force output device 200, the brake device 210, and the steering device 220 so that the vehicle M passes along the target trajectory generated by the action plan generation unit 140 at a scheduled time.

Returning to FIG. 2, the second control unit 160 includes, for example, an acquisition unit 162, a speed control unit 164, and a steering control unit 166. The acquisition unit 162 acquires information of a target trajectory (trajectory points) generated by the action plan generation unit 140 and causes the acquired information to be stored in a memory (not shown). The speed control unit 164 controls the travel driving force output device 200 or the brake device 210 on the basis of speed elements associated with the target trajectory stored in the memory. The steering control unit 166 controls the steering device 220 in accordance with a level of curve of a target trajectory stored in the memory. For example, processes of the speed control unit 164 and the steering control unit 166 are implemented by a combination of feed-forward control and feedback control. As one example, the steering control unit 166 executes feed-forward control according to the curvature of the road in front of the vehicle M and feedback control based on a deviation from the target trajectory in combination.

The travel driving force output device 200 outputs a travel driving force (torque) for driving the vehicle to the drive wheels. The travel driving force output device 200 includes, for example, a combination of an internal combustion engine, an electric motor, a transmission, and the like, and an electronic control unit (ECU) that controls these components. The ECU controls the above-described components in accordance with information input from the second control unit 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second control unit 160 or the information input from the driving operation element 80 so that brake torque according to a braking operation is output to each wheel. The brake device 210 may include a mechanism configured to transfer the hydraulic pressure generated by an operation of the brake pedal included in the driving operation element 80 to the cylinder via a master cylinder as a backup. Also, the brake device 210 is not limited to the above-described configuration and may be an electronically controlled hydraulic brake device configured to control the actuator in accordance with information input from the second control unit 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor to change the direction of the steerable wheels in accordance with the information input from the second control unit 160 or the information input from the driving operation element 80.

[Parking Lot Management Device]

Figure 4:
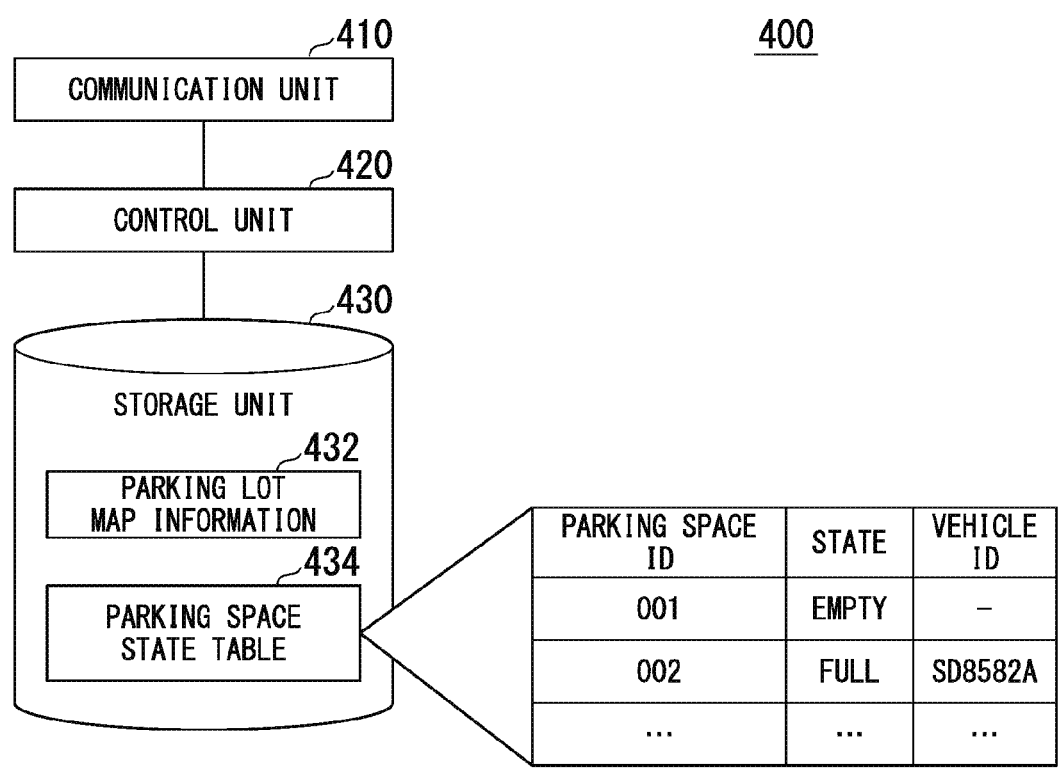
FIG. 4 is a diagram showing an example of the configuration of a parking lot management device 400.

FIG. 4 is a diagram showing an example of a configuration of the parking lot management device 400. The parking lot management device 400 includes, for example, a communication unit 410, a control unit 420, and a storage unit 430. The storage unit 430 stores information such as parking lot map information 432 and a parking space state table 434.

The communication unit 410 wirelessly communicates with the vehicle M and other vehicles, various server devices, and the user terminal T. Also, the communication unit 410 performs wireless or wired communication with a control device 500 to be described below. Also, the communication unit 410 periodically receives an image captured by a camera C (to be described below).

The control unit 420 guides the vehicle to the parking space PS on the basis of the information or image acquired by the communication unit 410 and the information stored in the storage unit 430. The parking lot map information 432 is information geometrically indicating a structure of the parking lot PA. The parking lot map information 432 includes coordinates for each parking space PS. In the parking space state table 434, for example, a state which is an empty state or a full (parked) state, a vehicle ID which is identification information of a parked vehicle in the case of the full state, and information of a destination direction after leaving that is information of a traveling direction of the vehicle after the vehicle leaves the parking lot PA are associated with a parking space ID which is identification information of the parking space PS. Here, the information of the destination direction after leaving recorded in the parking space state table 434 is referred to in a process of selecting a getting-into/out facility where the user U gets into the vehicle (i.e., determining the stopping area 310 to which the leaving vehicle M is automatedly moved and directed) to be executed by the control unit 420 when the leaving of the vehicle M has been requested by the user U. Also, various types of information stored in the parking space state table 434 are examples of "information associated with a parking lot".

When the communication unit 410 receives a parking request from the terminal device used by the user U (hereinafter referred to as the user terminal T) or the vehicle M, the control unit 420 extracts a parking space PS whose state is an empty state with reference to the parking space state table 434, acquires a position of the extracted parking space PS from the parking lot map information 432, and transmits a suitable route to the acquired position of the parking space PS to the vehicle using the communication unit 410. Also, the control unit 420 may recognize a congestion situation of the vehicle within the parking lot PA on the basis of the image periodically received from the camera C by the communication unit 410 and transmit a suitable route for causing the vehicle to move to the position of the parking space PS that has been extracted more smoothly to the vehicle. Also, the control unit 420 instructs a specific vehicle to stop or slow down as necessary on the basis of a positional relationship of a plurality of vehicles so that the vehicles do not move to the same position at the same time.

In the vehicle receiving the route (hereinafter referred to as the vehicle M), the autonomous parking control unit 142 of the automated driving control device 100 generates a target trajectory based on the route. Also, when the vehicle M approaches the target parking space PS, the parking space recognition unit 132 recognizes parking slot lines that partition the parking space PS and the like, recognizes a detailed position of the parking space PS, and provides the recognized position to the autonomous parking control unit 142. The autonomous parking control unit 142 receives the provided position to correct the target trajectory and cause the vehicle M to be parked in the parking space PS.

[Autonomous Parking Event—When Entering is Performed]

Figure 3:
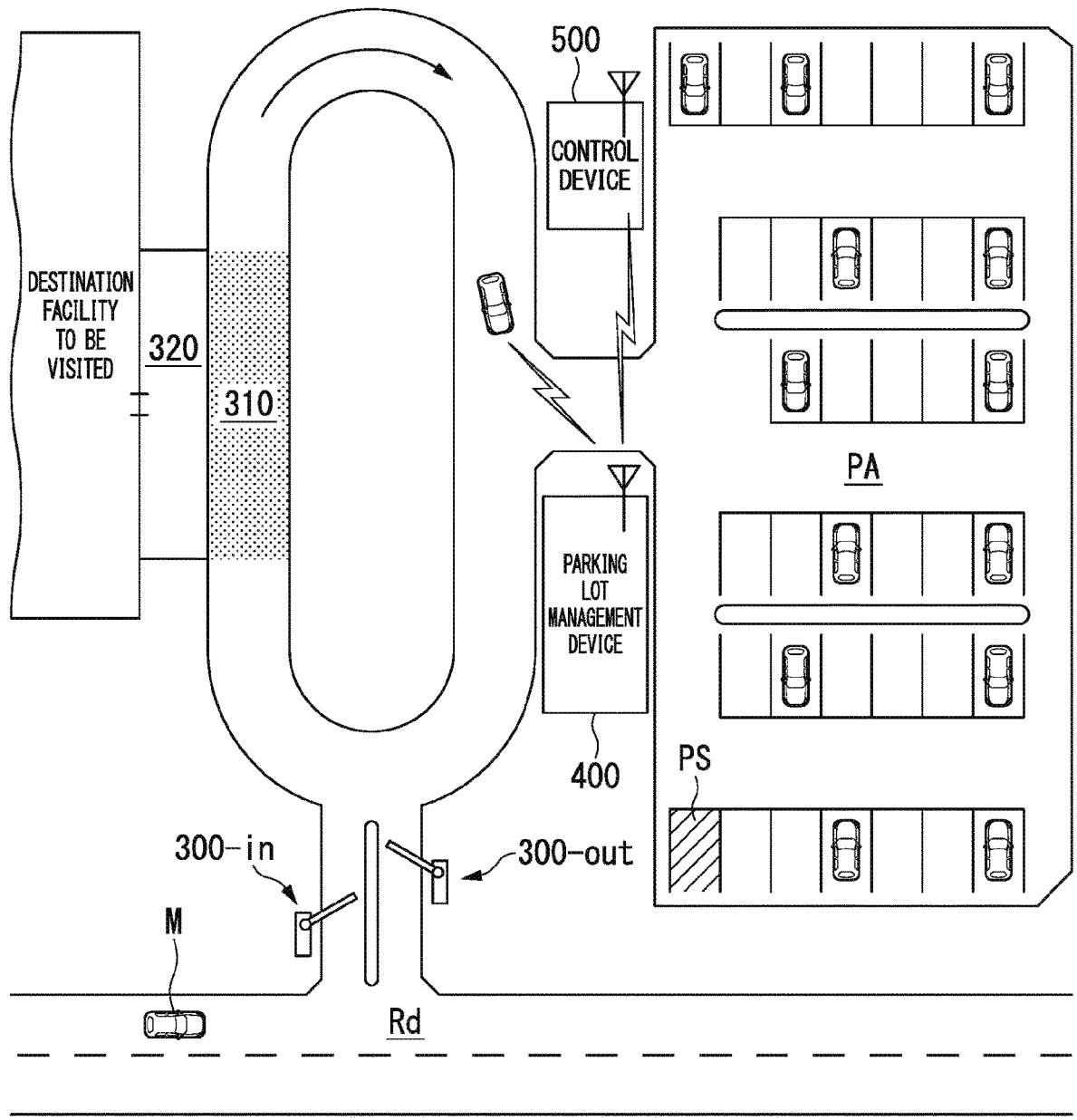
FIG. 3 is a diagram schematically showing a scene in which an autonomous parking event is executed.

For example, the autonomous parking control unit 142 causes the vehicle M to be parked within a parking space on the basis of information acquired from the parking lot management device 400 by the communication device 20. FIG. 3 is a diagram schematically showing a scene in which an autonomous parking event is executed. In the following description, a case in which a valet parking scheme is adopted in a part or all of a parking lot PA will be described. Although the parking lot PA in the scene shown in FIG. 3 is assumed to be mainly used by vehicles having a predetermined level or higher, the parking lot PA may accommodate a vehicle having automated driving level 3 or lower or a manually driven vehicle without being limited thereto.

Here, the automated driving level refers to, for example, a level according to a level of driving control in the system of the vehicle such as a level at which all driving control in the vehicle is automatedly performed, a level at which driving control such as acceleration/deceleration or steering is automatedly performed, or the like. In the following description of the present embodiment, the "automated driving level" is assumed to indicate a state in which an automated driving level at which automated driving can be executed by the vehicle M is highest as an example. That is, the vehicle M is assumed to travel at the automated driving level raised to the highest state within the parking lot PA even if the vehicle M is traveling at a lower automated driving level or is being manually driven.

For example, the automated driving levels include automated driving levels 1 to 4. Automated driving level 4 is a level at which all driving control in situations including emergency situations can be delegated to the vehicle system without requiring intervention of the driver such as monitoring of a traveling state of a vehicle of a driver (i.e., the driver's duty of care) or an operation on the driving operation element in at least a specific place (here, the parking lot PA).

Although automated driving level 3 has a lower level of driving control than automated driving level 4 and allows a lower duty of care to be imposed on the driver, automated driving level 3 is a level at which all driving control can be delegated to the vehicle system under a certain condition (for example, a case in which the vehicle travels on a congested road at a certain speed or the like).

Although automated driving level 2 has a lower level of driving control than automated driving level 3 and allows a higher duty of care to be imposed on the driver than automated driving level 3, automated driving level 2 is a level at which driving control of at least one of acceleration/deceleration and steering of the vehicle can be delegated to the vehicle system without performing an operation on the driving operation element.

Automated driving level 1 is a level at which only a specific function (for example, an inter-vehicle distance keeping function) in, for example, a driving assistance device represented by an adaptive cruise control system (ACC) and a lane keeping assistance system (LKAS), can be delegated to the vehicle system and the driver performs most control for causing the vehicle to travel, i.e., the vehicle system performs control of driving assistance instead of automated driving.

Automated driving level 1 or lower (for example, automated driving level 0) is a level of manual driving in which the vehicle system does not perform control related to driving control. In the following description, automated driving level 1 and automated driving level 2 are similar to manual driving, i.e., automated driving level 3 or higher is assumed to be a level of automated driving. It is assumed that each vehicle recognizes its own automated driving level.

When the vehicle M enters a valet parking type parking lot, the vehicle M stops in the stopping area 310 of the parking lot PA autonomously or on the basis of an instruction of an occupant (hereinafter referred to as the user U) of the vehicle M and allows the user U to get out of the vehicle M using the getting-into/out area 320 adjacent to the stopping area 310. The stopping area 310 is a dedicated area arranged within the parking lot PA and is an area at a position separated from the parking lot PA. The user U getting out of the vehicle M in the getting-into/out area 320 goes from the getting-into/out area 320 to the destination facility to be visited. The vehicle M allowing the user U to get out thereof is autonomously parked in an empty space (hereinafter, a parking space PS) within the parking lot. Details of a process until the vehicle M stops in the parking space PS will be described below. A combination of the stopping area 310 where the vehicle M stops and the getting-into/out area 320 used by the user U of the vehicle M is an example of the "getting-into/out facility".

When the vehicle M is allowed to leave the valet parking type parking lot, the vehicle M moves to the stopping area 310 in accordance with, for example, a leaving instruction from the user U, and allows the user U waiting in the getting-into/out area 320 to get into the vehicle M. The getting-into/out area 320 where the user U gets into the vehicle M is designated by the parking lot management device 400. Details of a leaving event will be described below.

Gates including a gate 300-in and a gate 300-out are provided on a route from a road Rd shown in FIG. 3 to the destination facility to be visited. Also, a plurality of gates may be provided and a suitable gate may be set in accordance with the automated driving level of the vehicle or a dedicated gate for a manual driving vehicle may be provided. The getting-into/out area 320 includes eaves for avoiding rain and snow.

The getting-into/out area 320 may have a dedicated getting-into area and a dedicated getting-out area or the dedicated getting-into area and the dedicated getting-out area may be changed according to the presence/absence and the number of users who desire to use the getting-into/out area 320. In the following description, a case in which a fixed dedicated getting-into area and a fixed dedicated getting-out area are not particularly provided in the getting-into/out area 320 and are shared by a user who gets into the vehicle and a user who gets out of the vehicle will be described.

A congestion level of the stopping area 310 may be recognized on the basis of an imaging result of a camera (not shown) for imaging (monitoring) the stopping area 310 or a recognition result of a vehicle using or passing through the stopping area 310 may be collected in the parking lot management device 400 and managed by the parking lot management device 400. The imaging result of the camera managed by the parking lot management device 400 and the recognition result of each vehicle collected by the parking lot management device 400 are examples of "information associated with the parking lot".

Also, in the parking lot PA, cameras such as a camera (not shown) for imaging (monitoring) a situation of each moving route for the vehicle to move within the parking lot PA, a camera (not shown) for imaging (monitoring) a situation within each parking area Pa, and a camera (not shown) for imaging (monitoring) a situation of each gate 300-out are provided at various positions. Hereinafter, the cameras are collectively referred to as cameras C. The camera C is, for example, a digital camera using a solid-state imaging device such as a CCD or a CMOS, and the camera C transmits periodically captured images to the parking lot management device 400. The parking lot management device 400 uses the images periodically transmitted by the cameras C as information for recognizing a congestion level of each getting-into/out facility, a moving route, or the parking lot PA, i.e., a congestion situation of vehicles or occupants of vehicles within the parking lot PA.

After the user is allowed to get out of the vehicle M in the stopping area 310, the vehicle M performs automated driving in an unmanned manner and starts an autonomous parking event in which the vehicle M moves to the parking space PS within the parking lot PA. A start trigger of the autonomous parking event may be, for example, any operation of the user or may be a predetermined signal wirelessly received from the parking lot management device 400. When the autonomous parking event starts, the autonomous parking control unit 142 controls the communication device 20 so that the communication device 20 transmits a parking request to the parking lot management device 400. The vehicle M moves from the stopping area 310 to the parking lot PA in accordance with the guidance of the parking lot management device 400 or while performing sensing on its own.

In the following description, the parking lot PA is assumed to be mainly used by a vehicle having an automated driving level that is higher than or equal to a predetermined level (for example, automated driving level 4 or higher).

Thus, a process when the automated driving level has changed to automated driving level 4 or higher will be described below.

Instead of the above, a process to be described below may be applied when the automated driving level is, for example, lower than automated driving level 4 or the present process may be applied even if the automated driving level transitions from automated driving level 3 to automated driving level 4 within the parking lot PA.

When the automated driving level of a vehicle entering a valet parking type parking lot is higher than or equal to a predetermined level, the parking lot management device 400 guides the vehicle M to autonomously travel and park in the parking space PS within the parking lot PA. On the other hand, when the automated driving level of the vehicle entering the valet parking type parking lot is lower than the predetermined level, the parking lot management device 400 guides the vehicle so that the vehicle stops in a specific getting-into/out facility. The specific getting-into/out facility is, for example, a getting-into/out facility having a lower stopping difficulty level than other getting-into/out facilities when the vehicle M is allowed to stop in the stopping area 310. The stopping difficulty level may be defined by, for example, a time period required for stopping or defined by a width of an extra space (a length in a vehicle length direction) in a vehicle traveling direction (the vehicle length direction) in the specific getting-into/out facility. Also, when the vehicle M is manually driven, the stopping difficulty level may be defined by the number of times the user operates the driving operation element 80 or the like.

[Autonomous Parking Event—When Leaving is Performed]

The autonomous parking control unit 142 and the communication device 20 maintain the operating state even if the vehicle M is parked. For example, when a leaving instruction transmitted by the parking lot management device 400 has been received in response to the leaving request transmitted by the user U, the autonomous parking control unit 142 causes the system of the vehicle M to be activated and causes the vehicle M to move to the designated stopping area 310 in accordance with the guidance of the parking lot management device 400. Also, the autonomous parking control unit 142 may cause the system of the vehicle M to be activated, for example, when the communication device 20 has received a pick-up request from the occupant's terminal device (the user terminal T) and may cause the vehicle M to move to the designated stopping area 310 in accordance with the guidance of the parking lot management device 400. At this time, the autonomous parking control unit 142 controls the communication device 20 so that the communication device 20 transmits a leaving request for requesting the guidance of movement from the parking space PS where the vehicle is currently parking to any one stopping area 310 to the parking lot management device 400. When the leaving request transmitted by the server device or the parking lot application which is being executed by the user terminal T of the user U, i.e., the user terminal T of the user U or the vehicle M, is received, the parking lot management device 400 selects any one getting-into/out area 320 and guides the vehicle M to the selected getting-into/out area 320. Also, in the following description, a case in which the leaving request is directly transmitted to the parking lot management device 400 by the parking lot application which is being executed by the user terminal T of the user U will be described.

The control unit 420 of the parking lot management device 400 instructs a specific vehicle to stop or slow down as necessary on the basis of a positional relationship of a plurality of vehicles so that the vehicles do not move to the same position at the same time as in the entering process. When the vehicle M is moved to the designated stopping area 310 and the occupant is allowed to get into the vehicle M, the autonomous parking control unit 142 causes the vehicle M to move to the designated gate 300-out in accordance with the guidance of the parking lot management device 400. When the vehicle M is moved to the designated gate 300-out, an operation of the autonomous parking control unit 142 is stopped and the manual driving or the automated driving by another functional unit is subsequently started.

The autonomous parking control unit 142 may find an empty parking space on its own on the basis of a detection result of the camera 10, the radar device 12, the finder 14, or the physical object recognition device 16 independently of communication and cause the vehicle M to be parked within the found parking space without being limited to the above description.

The parking lot management device 400 selects the stopping area 310 where the vehicle is moved so that the specific stopping area 310 within the parking lot PA is not congested. That is, the parking lot management device 400 assigns a getting-into/out facility to be used for the user to get into the vehicle parked in the parking lot PA in order to prevent a situation in which users of vehicles are concentrated at a specific getting-into/out facility and leaving of vehicles from the parking lot PA is time-consuming.

[Control Device]

Figure 5:
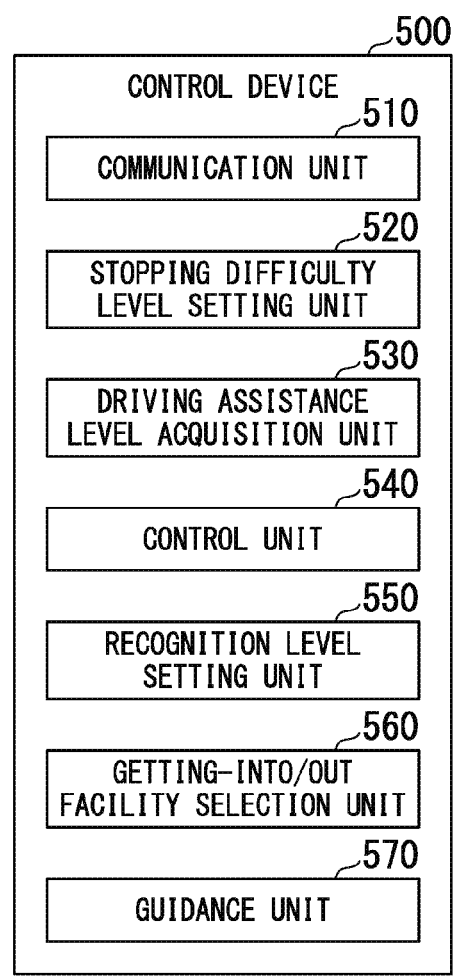
FIG. 5 is a configuration diagram of a control device 500.

FIG. 5 is a configuration diagram of the control device 500. The control device 500 includes, for example, a communication unit 510, a stopping difficulty level setting unit 520, a driving assistance level acquisition unit 530, a control unit 540, a recognition level setting unit 550, a getting-into/out facility selection unit 560, and a guidance unit 570. Also, although the parking lot management device 400 and the control device 500 will be described as independent devices, they may function as an integrated device.

The communication unit 510 performs wireless or wired communication with the parking lot management device 400. Also, the communication unit 510 periodically receives an image captured by the camera C. Also, the communication unit 510 wirelessly communicates with the vehicle M and other devices directly (or via the communication unit 410 of the parking lot management device 400) and periodically receives a recognition result of the recognition unit 130 of the vehicle M.

The stopping difficulty level setting unit 520 acquires information associated with the stopping difficulty level of the stopping area 310 and sets the stopping difficulty level. The information associated with the stopping difficulty level of the stopping area 310 includes, for example, a predicted time period required to stop the vehicle M in the stopping area 310 or a size of an extra space in the vehicle traveling direction (the vehicle length direction) in the stopping area 310. The information associated with the stopping difficulty level of the stopping area 310 and the stopping difficulty level of the stopping area 310 may be obtained by referring to information set by a manager of the parking lot PA or the like as it is or may be derived on the basis of the recognition result of the recognition unit 130 of the vehicle M received by the communication unit 510 on its own.

For example, when the information stored in the storage unit 430 of the parking lot management device 400 includes information of the stopping difficulty level associated with the stopping area 310, the stopping difficulty level setting unit 520 acquires the information of the stopping difficulty level. Also, when the information stored in the storage unit 430 of the parking lot management device 400 does not include the information of the stopping difficulty level associated with the stopping area 310, the stopping difficulty level setting unit 520 may acquire information necessary for setting the stopping difficulty level from the vehicle M to set the stopping difficulty level on its own.

The driving assistance level acquisition unit 530 acquires the level of driving assistance capable of being executed by the vehicle M. The driving assistance level is defined by, for example, a time period required for the vehicle M to complete parallel parking, a size of an extra space in the vehicle traveling direction (the vehicle length direction) required when the vehicle M performs parallel parking if there is no assistance from another device or another vehicle, a size of an extra space in the vehicle traveling direction required when the vehicle M autonomously performs parallel parking if there is assistance from another device or another vehicle, or the like. For example, the driving assistance level acquisition unit 530 may set a driving assistance level for a vehicle that requires 30 [sec] from the start to the end of the automated parking event higher than that for a vehicle that requires 45 [sec] from the start to the end of the automated parking event.

Also, the driving assistance level acquisition unit 530 may acquire the automated driving level of the vehicle M.

The control unit 540 outputs at least one of a setting result set by the stopping difficulty level setting unit 520 and an acquisition result acquired by the driving assistance level acquisition unit 530 to the getting-into/out facility selection unit 560.

The recognition level setting unit 550 evaluates a surrounding recognition ability of the vehicle M and sets a recognition level. A method of setting the recognition level will be described below.

The getting-into/out facility selection unit 560 selects the stopping area 310 and the getting-into/out area 320 to be used by the vehicle M on the basis of at least an output result of the control unit 540 and a setting result of the recognition level setting unit 550. A selection result of the getting-into/out facility selection unit 560 may be transmitted to the vehicle M via the communication unit 510 and displayed on the HMI 30 or the like or may be transmitted to the vehicle M and the user U via the parking lot management device 400.

The getting-into/out facility selection unit 560 may select the stopping area 310 and the getting-into/out area 320 to be used by the vehicle M on the basis of the setting result of the recognition level setting unit 550 of another vehicle that is likely to use the getting-into/out facility in the same time period as the vehicle M.

The getting-into/out facility selection unit 560 selects the getting-into/out facility as described above in response to a leaving request for causing the parked vehicle M to automatedly move from the stop position to the getting-into/out facility. Also, when the vehicle M is allowed to enter the parking lot PA, a getting-into/out facility is selected.

The guidance unit 570 guides the vehicle M to the getting-into/out facility selected by the getting-into/out facility selection unit 560. At this time, the guidance unit 570 causes the system of the vehicle M to be activated and causes the autonomous parking control unit 142 to control the vehicle M so that the vehicle M goes to the getting-into/out facility selected by the getting-into/out facility selection unit 560. Also, the guidance unit 570 may instruct the vehicle M to go to the getting-into/out facility selected by the getting-into/out facility selection unit 560. The instruction is, for example, an instruction for guiding the vehicle M by providing information about a target getting-into/out facility, a route to the getting-into/out facility, and the like. The guidance unit 570 may cause the vehicle M to automatedly travel according to a remote operation. The guidance unit 570 may also cause the vehicle M to automatedly travel to the gate 300-out according to a remote operation after the user U is allowed to get into the vehicle M in the stopping area 310 selected by the getting-into/out facility selection unit 560.

[Recognition Level Setting]

Hereinafter, a method in which the recognition level setting unit 550 sets a recognition level of the vehicle M will be described.

For example, the recognition level is derived on the basis of a level of matching of processing results between devices and a level of matching of processing results in time series in processing results of the camera 10, the radar device 12, the finder 14, and the physical object recognition device 16. Also, the recognition level may be further estimated on the basis of a failure state of each device or an external environment of the vehicle M (for example, the weather, surrounding brightness, a level of congestion of a space, or the like). Also, the recognition level may be derived by the physical object recognition device 16. Also, the recognition level setting unit 550 may add a value derived by an internal integrated circuit (IC) or the like of the camera 10, the radar device 12, and the finder 14 to the recognition level.

[Recognition Level Setting Using Automated Driving Level]

The recognition level setting unit 550 may set the recognition level on the basis of an automated driving level at which automated driving can be executed by the vehicle M. In that case, the recognition level setting unit 550 sets the recognition level of the vehicle M on the basis of the driving assistance level acquired by the driving assistance level acquisition unit 530. In this case, the getting-into/out facility selection unit 560 selects a getting-into/out facility on the basis of the recognition level of the vehicle M set on the basis of the driving assistance level acquired by the driving assistance level acquisition unit 530. That is, the getting-into/out facility selection unit 560 selects a getting-into/out facility on the basis of the driving assistance level such as the automated driving level of the vehicle M.

Also, when a driving assistance level at which driving assistance can be executed by the vehicle M is determined, the recognition level setting unit 550 may set the recognition level of the vehicle M in accordance with the driving assistance level.

For example, when the automated driving level of the vehicle M is used for evaluation of the driving assistance level, the recognition level setting unit 550 sets a recognition level that is lower than that of the vehicle having automated driving level 5 and higher than that of the vehicle having automated driving level 3 if the vehicle M is a vehicle having automated driving level 4.

Also, when the recognition level cannot be set in the above-described method, the recognition level setting unit 550 may estimate the recognition level from information provided by a manufacturer related to standard equipment of a type of vehicle M on the basis of information of the type of vehicle M or the like. Also, when the recognition level of the vehicle M cannot be acquired, the recognition level setting unit 550 may determine the recognition level of the vehicle M as a lowest level among levels capable of being set by the recognition level setting unit 550.

[Process of Selecting Getting-Into/Out Facility]

Hereinafter, a process of selecting a getting-into/out facility to be used by the user U (determining a stopping area 310 to which the leaving vehicle M is automatedly moved and directed) implemented by the getting-into/out facility selection unit 560 will be described.

Figure 6:
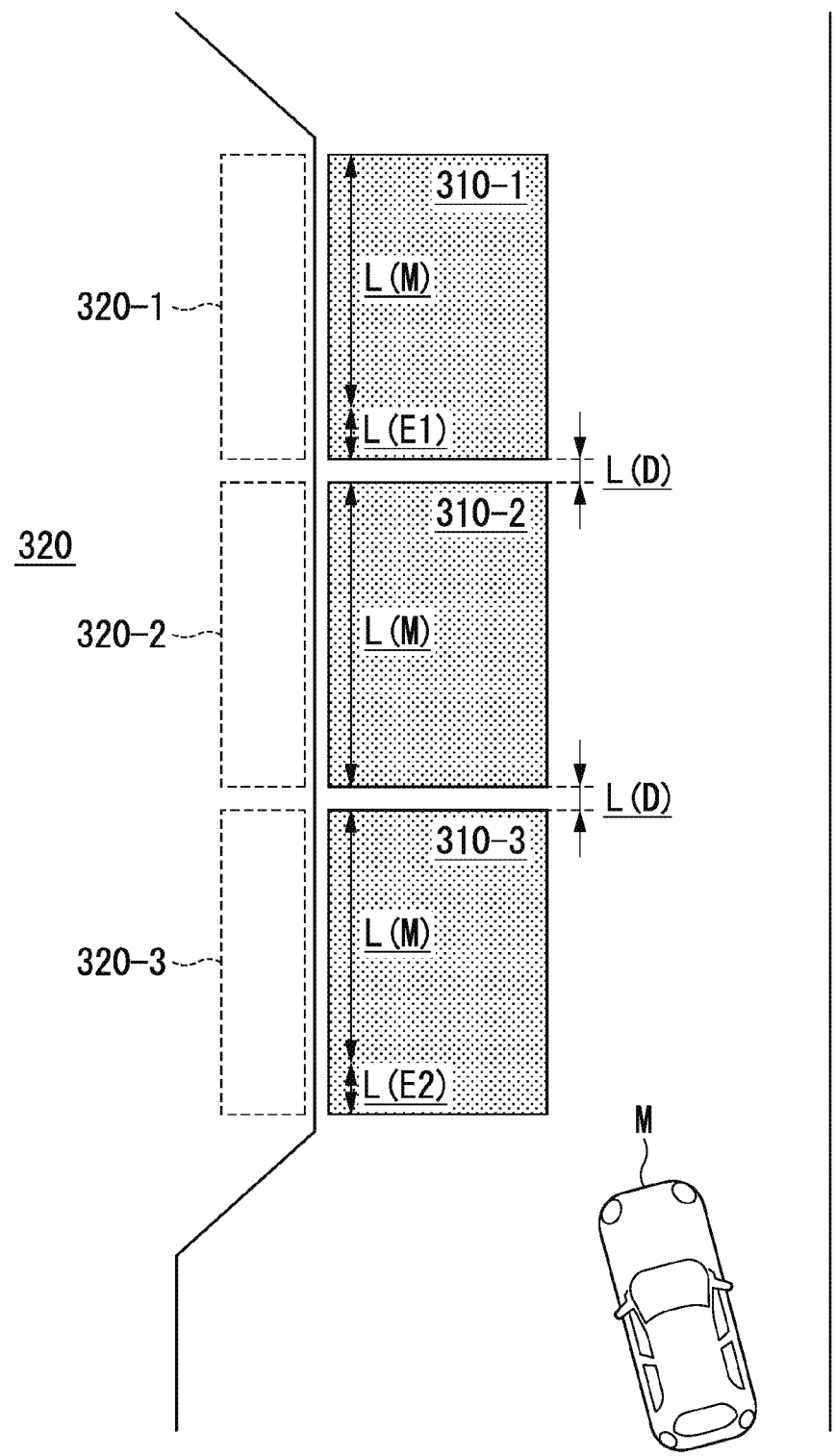
FIG. 6 is a diagram showing an example of an arrangement of a stopping area 310 and a getting-into/out area 320.

FIG. 6 is a diagram showing an example of an arrangement of the stopping area 310 and the getting-into/out area 320. As shown in FIG. 6, in the stopping area 310, reference positions (hereinafter referred to as stopping areas 310-1 to 310-3) where vehicles stop are set so that three vehicles can stop at one time. Also, each of the stopping areas 310-1 to 310-3 may be identified by a fixed lane marking or may be variable in accordance with a size of a vehicle scheduled to stop. As shown in FIG. 6, an extra space of a length L(D) is further provided between the stopping area 310-1 and the stopping area 310-2 and between the stopping area 310-2 and the stopping area 310-3. Also, the extra space of the length L(D) may be omitted.

The stopping areas 310-1 to 310-3 may be associated with getting-into/out area 320-1 to 320-3 used by the user using the stopping area when he or she gets into or out of the vehicle, respectively. In the example of FIG. 6, each of an area where the stopping area 310-1 and the getting-into/out area 320-1 are combined, an area where the stopping area 310-2 and the getting-into/out area 320-2 are combined, and an area where the stopping area 310-3 and the getting-into/out area 320-3 are combined is an example of the "getting-into/out facility".

Also, each of the getting-into/out areas 320-1 to 320-3 may include an area line indicating a boundary with another area and the like.

Also, when the parking lot PA can accommodate large vehicles, two areas of the stopping areas 310-1 and 310-2 or three areas of the stopping areas 310-1 to 310-3 may be occupied by one large vehicle.

In the following description, the long side of the rectangle of the stopping area 310-1 is configured to have a length L(M) in the vehicle length direction required for the vehicle M to parallel park and a length L(E1) of an extra space in consideration of opening of a rear hatch and the like. The length L(M) is, for example, about 1.5 times the length of the vehicle M.

Also, the long side of the rectangle of the stopping area 310-2 is the length L(M) in the vehicle length direction required for the vehicle M to parallel park. Also, the long side of the rectangle of the stopping area 310-3 is configured to have a length L(M) in the vehicle length direction necessary for the vehicle M to parallel park and a length L(E2) of an extra space. The length L(E1) and the length L(E2) may be the same. In the example shown in FIG. 6, the stopping area 310-2 is an example of a getting-into/out facility with a high stopping difficulty level and the stopping area 310-1 and the stopping area 310-3 are examples of a getting-into/out facility with a low stopping difficulty level.

The getting-into/out facility selection unit 560 selects any one of the stopping areas 310-1 to 310-3 shown in FIG. 6 on the basis of, for example, the performance of surrounding recognition of the vehicle M. For example, the stopping area 310-2 is selected when the automated driving level of the vehicle M is a predetermined automated driving level and the stopping area 310-1 where a leaving process is easy is selected when the automated driving level of the vehicle M is lower than the predetermine automated driving level described above.

Figure 7:
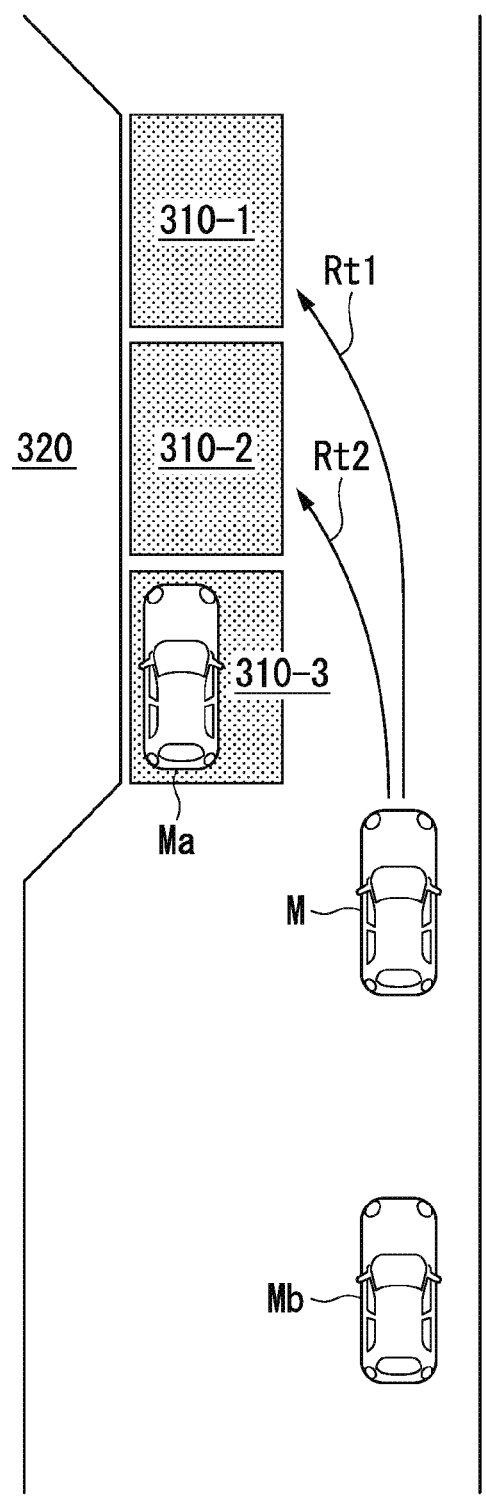
FIG. 7 is a diagram for describing a selection process of a getting-into/out facility selection unit 560.

FIG. 7 is a diagram showing a selection process of the getting-into/out facility selection unit 560. The getting-into/out facility selection unit 560 may be configured to select the stopping area 310 in which the stopping difficulty level is higher and the vehicle M can stop (i.e., to positively select the stopping area 310 in which the vehicle M can stop and which has a highest stopping difficulty level) from among the stopping areas 310 in the empty state.

Also, when another vehicle uses the getting-into/out facility while the vehicle M is using the getting-into/out facility, the getting-into/out facility selection unit 560 may compare sizes of the other vehicle and the host vehicle, and recognition levels (recognition accuracy levels) in the physical object recognition device 16, and the like and select the stopping area 310 on the basis of comparison results.

When the recognition level of the vehicle M is higher than that of another vehicle Mb, the getting-into/out facility selection unit 560 selects the stopping area 310 having a higher stopping difficulty level. Also, when the recognition level of the vehicle M is lower than that of the other vehicle Mb, the getting-into/out facility selection unit 560 selects the stopping area 310 having a lower stopping difficulty level from among the stopping areas 310 where the vehicle M can stop.

In the example shown in FIG. 7, the getting-into/out facility selection unit 560 selects the stopping area 310-2 as the stopping area 310 where the vehicle M is stopped (i.e., the vehicle M hands over the stopping area 310-1 having a lower stopping difficulty level to the other vehicle Mb). In this case, the guidance unit 570 generates a trajectory Rt2 for moving to the stopping area 310-2 and transmits the generated trajectory Rt2 to the vehicle M. When the stopping area 310-1 is an example of a getting-into/out facility selected in a situation in which the recognition level of the vehicle is lower than a first level, the stopping area 310-2 is an example of a getting-into/out facility selected in a situation in which the recognition level of the vehicle is higher than or equal to the first level.

However, the getting-into/out facility selection unit 560 may select a suitable getting-into/out facility in accordance with a situation of another vehicle using the getting-into/out facility. For example, when another vehicle Ma in FIG. 7 is about to depart, it is possible to shorten a time period in which the course of the other vehicle Ma is hindered when the stopping area 310-1 is used compared with when the vehicle M is stopped in the stopping area 310-2 adjacent in the traveling direction of the other vehicle Ma. In such a case, the getting-into/out facility selection unit 560 may select that the vehicle M is allowed to use the stopping area 310-1 while the stopping area 310-2 is kept as an empty space so that the other vehicle Ma can easily depart (in a state in which the stopping area 310-2 is excluded from selection candidates). At this time, the guidance unit 570 generates a trajectory Rt1 for moving to the stopping area 310-1 and transmits the generated trajectory Rt1 to the vehicle M.

Also, for example, the getting-into/out facility selection unit 560 may be configured to select a getting-into/out facility having a higher stopping difficulty level than a getting-into/out facility selected in a situation in which the recognition level of the vehicle is lower than the first level when the driving assistance level is higher than or equal to the first level and lower than the second level higher than the first level and select a getting-into/out facility having a higher stopping difficulty level than a getting-into/out facility selected in a situation in which the recognition level of the vehicle is higher than or equal to the first level and lower than the second level when the recognition level of the vehicle is higher than or equal to the second level.

Figure 8:
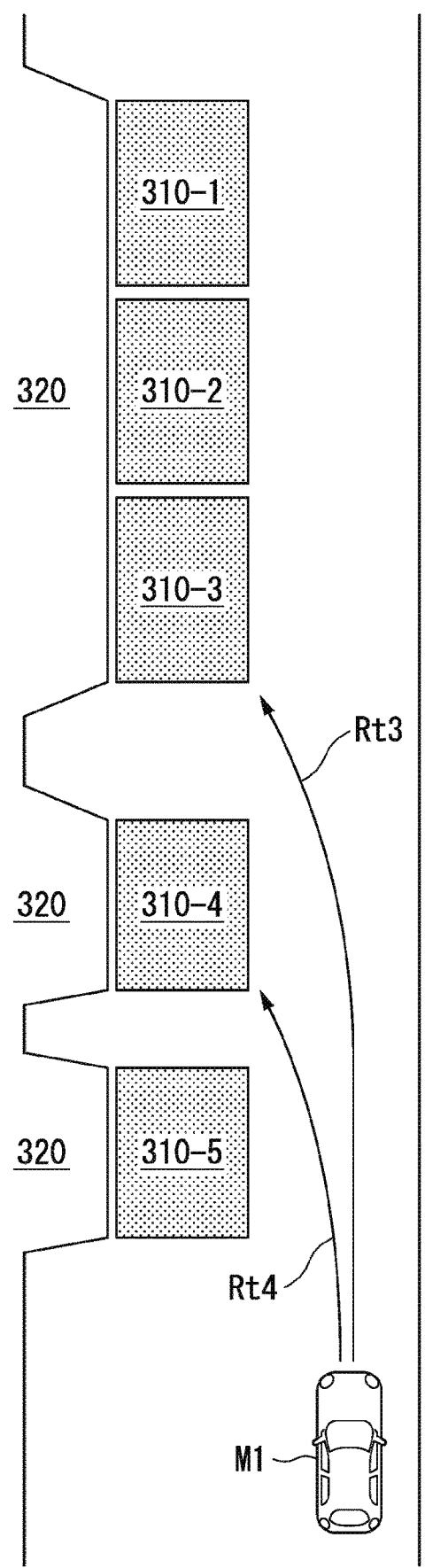
FIG. 8 is a diagram showing another example of the arrangement of the stopping area 310 and the getting-into/out area 320.

FIG. 8 is a diagram showing another example of the arrangement of the stopping area 310 and the getting-into/out area 320. The stopping area 310 shown in FIG. 8 includes a stopping area 310-4 and a stopping area 310-5 in addition to the stopping areas 310-1 to 310-3 shown in FIG. 6. In the stopping area 310-4 and the stopping area 310-5, for example, an independent unit can be used for each vehicle and a sufficient inter-vehicle distance from other vehicles is secured as compared with the stopping area 310-1 and the like.

The stopping area 310-4 and the stopping area 310-5 shown in FIG. 8 are getting-into/out facilities with a low stopping difficulty level. Thus, the stopping area 310-4 and the stopping area 310-5 are mainly assigned to a vehicle having a low recognition level or a manual driving vehicle. The getting-into/out facility selection unit 560 selects, for example, any one of the stopping areas 310-1 to 310-3 for a vehicle having a recognition level that is higher than or equal to a reference level. Also, the getting-into/out facility selection unit 560 selects, for example, one of the stopping area 310-4 and the stopping area 310-5 for a vehicle having a lower recognition level than the reference level. When the stopping area 310-4 and the stopping area 310-5 are examples of a getting-into/out facility selected in a situation in which the recognition level of the vehicle is lower than the first level, the stopping area 310-1 is an example of a getting-into/out facility selected in a situation in which the recognition level of the vehicle is higher than or equal to the first level and lower than the second level and the stopping area 310-2 is an example of a getting-into/out facility selected in a situation in which the recognition level of the vehicle is higher than or equal to the second level.

Also, in the following description, the getting-into/out facilities where vehicles are parallel parked such as the stopping areas 310-1 to 310-3 may be referred to as "parallel getting-into/out facilities" and getting-into/out facilities that are independent such as the stopping area 310-4 and the stopping area 310-5 may be referred to as "independent getting-into/out facilities".

Accordingly, when the vehicle M is being manually driven by the user U or is a vehicle having a low recognition level, the getting-into/out facility selection unit 560 selects the stopping area 310-4 or the stopping area 310-5. Also, when the stopping area 310-4 and the stopping area 310-5 are in use, the getting-into/out facility selection unit 560 selects the stopping area 310-1 or the stopping area 310-3 and excludes the stopping area 310-2 from selection. However, when an empty area is only the stopping area 310-2, the getting-into/out facility selection unit 560 may allow the user U of the vehicle M to determine whether to stop in the stopping area 310-2, determine whether to wait for the stopping area 310-4 or the stopping area 310-5 to be in an empty state, or the like and perform selection in accordance with a determination result.

In the example shown in FIG. 8, when the stopping area 310-3 having a high stopping difficulty level has been selected by the getting-into/out facility selection unit 560, the guidance unit 570 generates a trajectory Rt3 for moving to the stopping area 310-3 and transmits the generated trajectory Rt3 to the vehicle M. Also, when the stopping area 310-4 having a low stopping difficulty level has been selected by the getting-into/out facility selection unit 560, the guidance unit 570 generates a trajectory Rt4 for moving to the stopping area 310-4 and transmits the generated trajectory Rt4 to the vehicle M.

Figures 9, 10:
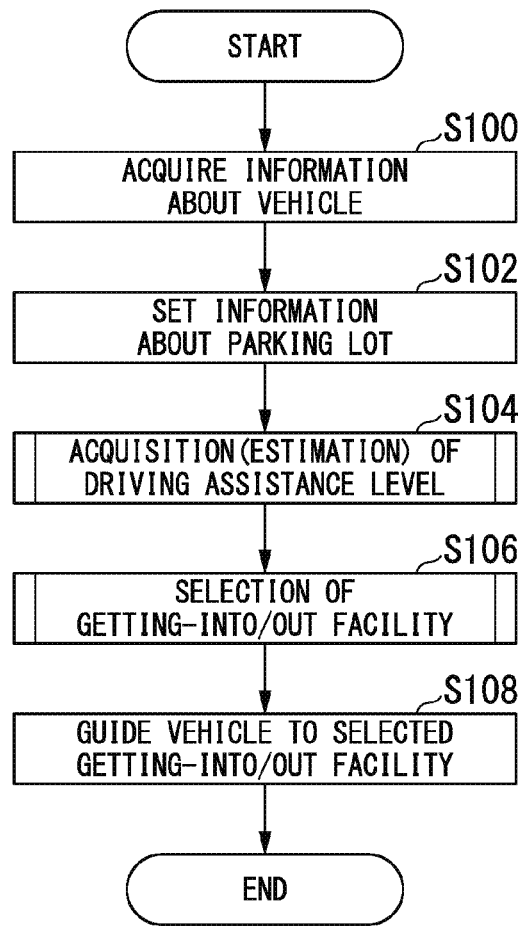
FIG. 9 is a diagram showing an example of a result of acquiring a stopping difficulty level of each getting-into/out facility in the stopping difficulty level setting unit 520.
FIG. 10 is a flowchart showing an example of a flow of a process in which the control device 500 selects a getting-into/out facility.

FIG. 9 is a diagram showing an example of a result of setting a stopping difficulty level of each getting-into/out facility in the stopping difficulty level setting unit 520. For example, the stopping difficulty level setting unit 520 acquires information about the stopping difficulty level shown in FIG. 9 (or sets the stopping difficulty level on its own) with respect to the getting-into/out facility shown in FIG. 8. The getting-into/out facility selection unit 560 selects the getting-into/out facility to be used by the vehicle M, for example, on the basis of the result of setting a stopping difficulty level shown in FIG. 9.

Also, the getting-into/out facility selection unit 560 may perform selection in accordance with the automated driving level of the vehicle M. For example, when the automated driving level of the vehicle M is higher than a predetermined level, the getting-into/out facility selection unit 560 selects the stopping area 310-2 having a "high" stopping difficulty level shown in FIG. 9. When the automated driving level of the vehicle M is approximately the same as the predetermined level, the getting-into/out facility selection unit 560 selects the stopping area 310-1 or the stopping area 310-3 having a "medium" stopping difficulty level. When the automated driving level of the vehicle M is lower than the predetermined level, the getting-into/out facility selection unit 560 selects the stopping area 310-4 or the stopping area 310-5 having a "low" stopping difficulty level.

[Process Flow 1]

Hereinafter, a flow of a process in which the control device 500 selects a getting-into/out facility will be described. FIG. 10 is a flowchart showing an example of the flow of the process in which the control device 500 selects the getting-into/out facility. The process shown in FIG. 10 is performed, for example, when the vehicle M to be controlled by the control device 500 enters a parking lot PA (when the vehicle M passes through a gate 300-in or the like) or when the vehicle M intends to leave (when the vehicle M receives a leaving request or the like).

First, the stopping difficulty level setting unit 520 acquires information about a vehicle and sets a stopping difficulty level (step S100). Next, the driving assistance level acquisition unit 530 acquires information about the parking lot (step S102). Next, the recognition level setting unit 550 acquires (or estimates) a driving assistance level of the vehicle M on the basis of a processing result of at least one of the stopping difficulty level setting unit 520 and the driving assistance level acquisition unit 530 (step S104). Details of the processing of step S104 will be described below using another flowchart.

Next, the getting-into/out facility selection unit 560 selects a getting-into/out facility to be used by the vehicle M on the basis of at least an output result of the control unit 540 and a setting result of the recognition level setting unit 550 (step S106). Details of the processing of step S106 will be described below using another flowchart. Next, the guidance unit 570 guides the vehicle M to go toward the getting-into/out facility selected by the getting-into/out facility selection unit 560 (step S108). Accordingly, the description of the process of the present flowchart ends.

[Process Flow 2]

Figure 11:
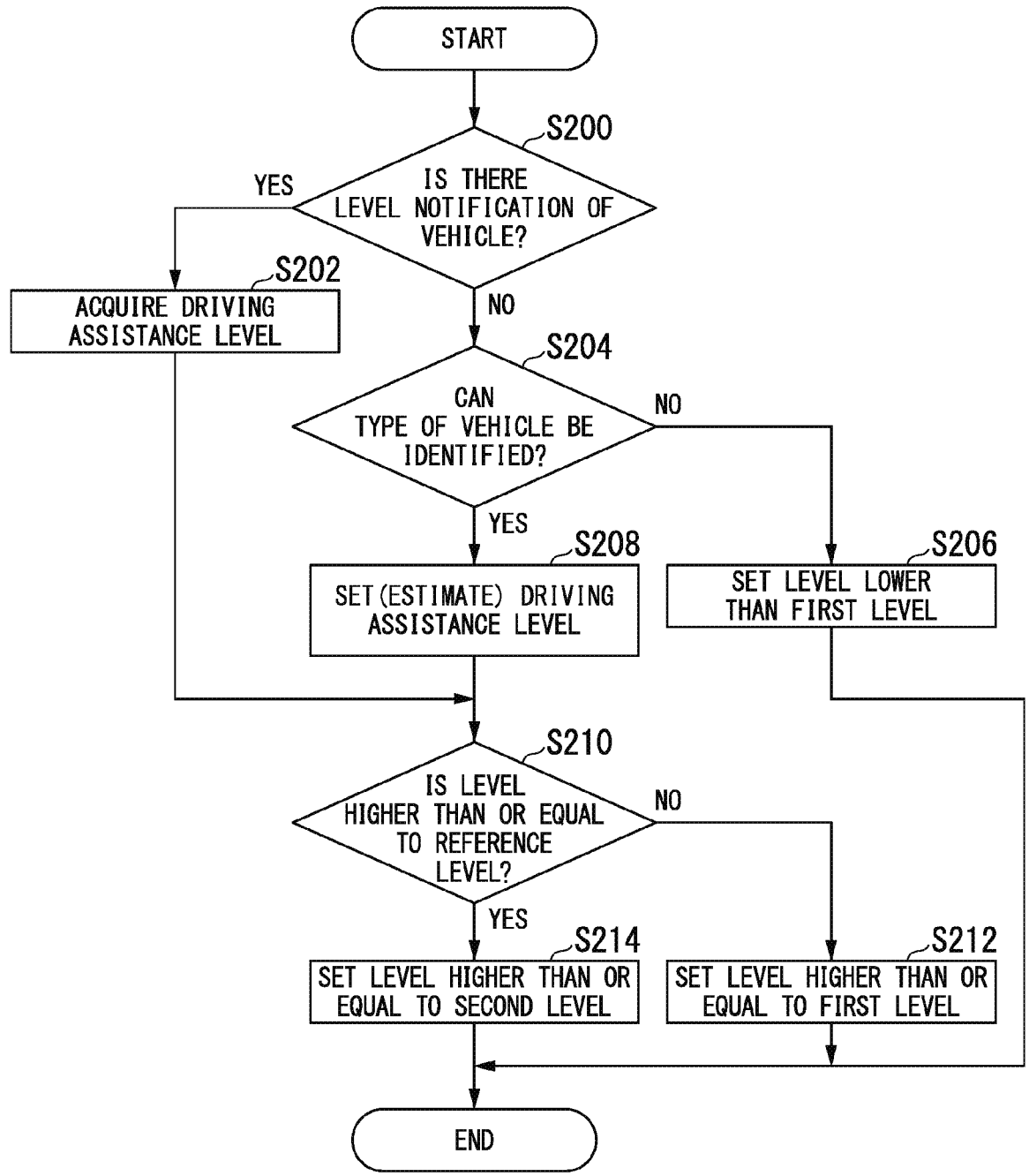
FIG. 11 is a flowchart showing an example of a flow of a process in which a recognition level setting unit 550 acquires (or estimates) a driving assistance level of a vehicle M.

Hereinafter, a flow of a process in which the recognition level setting unit 550 acquires (or estimates) a driving assistance level of the vehicle M will be described. FIG. 11 is a flowchart showing an example of the flow of the process in which the recognition level setting unit 550 acquires (or estimates) the driving assistance level of the vehicle M.

First, the recognition level setting unit 550 determines whether there is a notification about a driving assistance level such as an automated driving level from the vehicle M, i.e., whether information acquired from the vehicle M by the stopping difficulty level setting unit 520 includes information about a driving assistance level at which driving assistance can be executed by the vehicle M (step S200). When there is a notification, the recognition level setting unit 550 acquires the driving assistance level on the basis of notification details of the vehicle M (step S202).

When there is no notification, the recognition level setting unit 550 determines whether or not a type of vehicle M can be identified on the basis of acquisition results of the stopping difficulty level setting unit 520 and the driving assistance level acquisition unit 530 (step S204). When the type of vehicle M cannot be identified, the recognition level setting unit 550 sets a level lower than the first level as the recognition level of the vehicle M (step S206) and ends the process of the present flowchart. When the type of vehicle M can be identified, the recognition level setting unit 550 acquires (or estimates) the driving assistance level on the basis of information about the identified type of vehicle M (step S208).

Next, the recognition level setting unit 550 determines whether or not the recognition level of the vehicle M is higher than or equal to the reference level on the basis of the driving assistance level (step S210). When the recognition level of the vehicle M is not higher than or equal to the reference level, the recognition level setting unit 550 sets a level higher than or equal to the first level and lower than the second level as the recognition level of the vehicle M (step S212) and ends the process of the present flowchart. When the level is higher than or equal to the reference level, the recognition level setting unit 550 sets the recognition level of the vehicle M to a level higher than or equal to the second level (step S214). Accordingly, the description of the process of the present flowchart ends.

[Process Flow 3]

Figure 12:
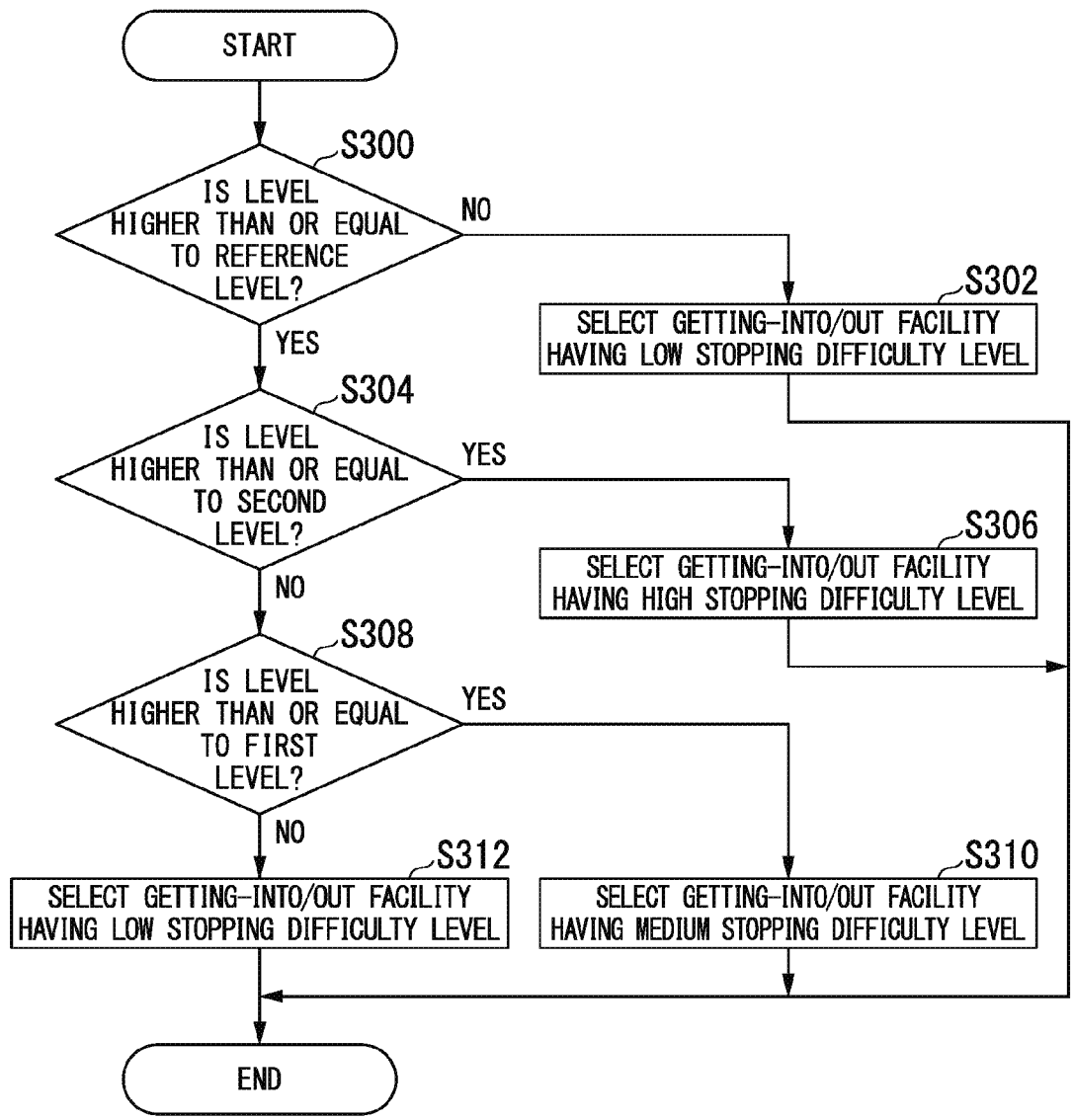
FIG. 12 is a flowchart showing an example of a flow of a process in which the getting-into/out facility selection unit 560 selects a getting-into/out facility to be used by the vehicle M.

Hereinafter, a flow of a process in which the getting-into/out facility selection unit 560 selects a getting-into/out facility to be used by the vehicle M will be described. FIG. 12 is a flowchart showing an example of the flow of the process in which the getting-into/out facility selection unit 560 selects the getting-into/out facility to be used by the vehicle M.

First, the getting-into/out facility selection unit 560 determines whether or not the recognition level of the vehicle M is higher than or equal to the reference level (step S300). When the recognition level of the vehicle M is lower than the reference level, the getting-into/out facility selection unit 560 selects a getting-into/out facility having a low stopping difficulty level as the getting-into/out facility in which the vehicle M is stopped (step S302) and ends the process of the present flowchart.

When the recognition level of the vehicle M is higher than or equal to the reference level, the getting-into/out facility selection unit 560 determines whether or not the recognition level of the vehicle M is higher than or equal to the second level (step S304). When the recognition level of the vehicle M is higher than or equal to the second level, the getting-into/out facility selection unit 560 selects a getting-into/out facility having a high stopping difficulty level (step S306) and ends the process of the present flowchart.

When the recognition level of the vehicle M is lower than the second level, the getting-into/out facility selection unit 560 determines whether or not the recognition level of the vehicle M is higher than or equal to the first level (step S308). When the recognition level of the vehicle M is higher than or equal to the first level, the getting-into/out facility selection unit 560 selects a getting-into/out facility having a medium stopping difficulty level (step S310) and ends the process of the present flowchart. When the recognition level of the vehicle M is lower than the first level, the getting-into/out facility selection unit 560 selects the getting-into/out facility having a low stopping difficulty level (step S312) and ends the process of the present flowchart.

As described above, according to the first embodiment, the control device 500 includes the getting-into/out facility selection unit 560 configured to refer to information indicating a driving assistance level at which driving assistance can be executed by the vehicle M set by the stopping difficulty level setting unit 520 and information associated with the parking lot PA having a plurality of getting-into/out facilities acquired by the driving assistance level acquisition unit 530 and select one or more getting-into/out facilities where the vehicle M to be parked in the parking lot PA will stop from among the plurality of getting-into/out facilities; and the guidance unit 570 configured to guide the vehicle M to the selected getting-into/out facility. Therefore, it is possible to guide the vehicle M to a getting-into/out facility suitable for the vehicle M according to a size of the vehicle M or the performance of the vehicle M and reduce the congestion of the stopping area 310 and the getting-into/out area 320.

Second Embodiment

Hereinafter, a second embodiment will be described. In the second embodiment, a case in which a function corresponding to the control device 500 is included in an automated driving control device 100 mounted in a vehicle M will be described. Also, in the second embodiment, a case in which the vehicle M may be an automated driving vehicle or may not be an automated driving vehicle (i.e., a user U of the vehicle drives and steers the vehicle on his or her own) will be described.

Figure 13:
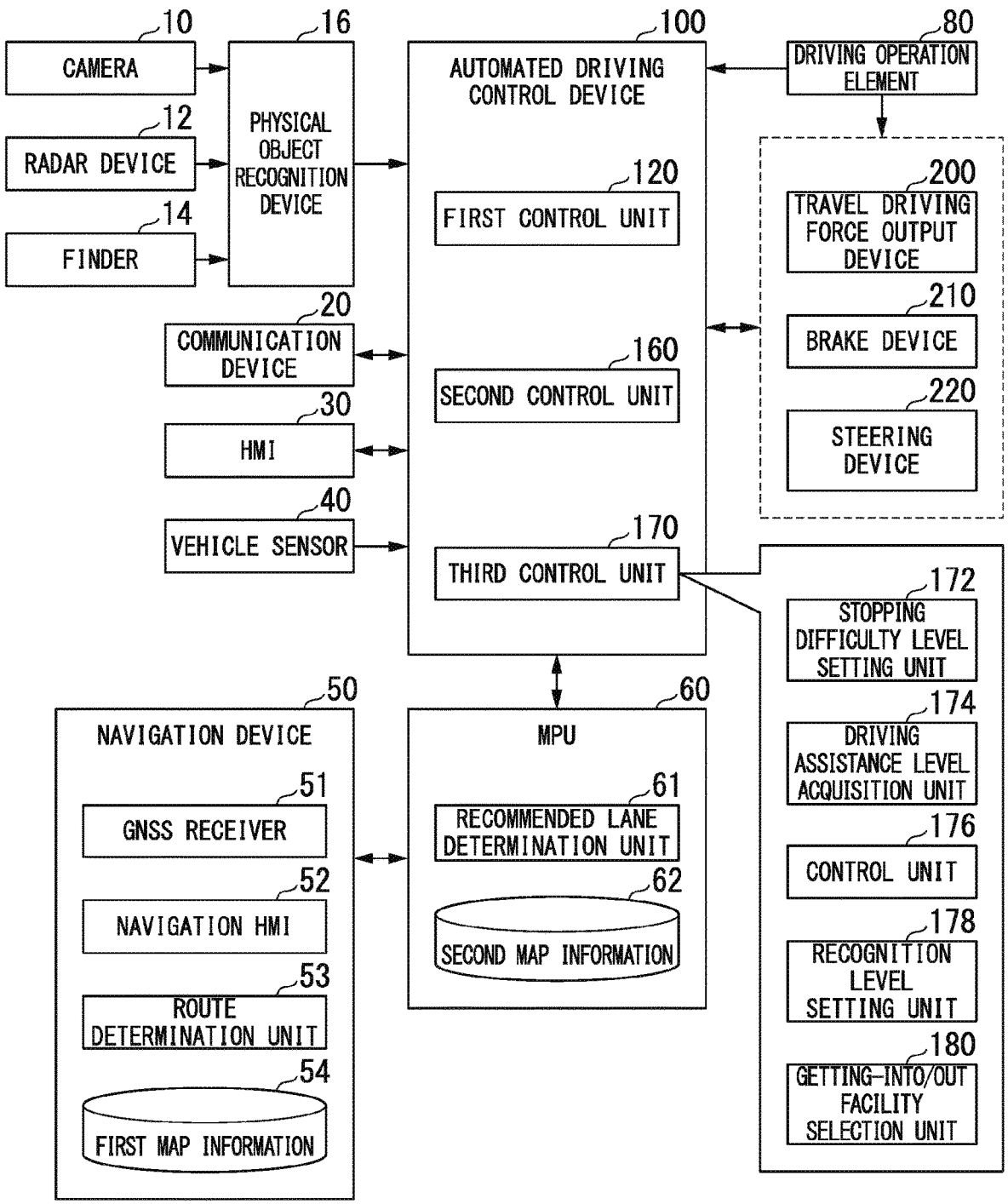
FIG. 13 is a configuration diagram of a vehicle system 1A including a vehicle control device according to a second embodiment.

FIG. 13 is a configuration diagram of a vehicle system 1A including the vehicle control device of the second embodiment. The vehicle system 1A further includes a third control unit 170 in addition to the vehicle system 1 of FIG. 2.

The third control unit 170 includes, for example, a stopping difficulty level setting unit 172, a driving assistance level acquisition unit 174, a control unit 176, a recognition level setting unit 178, and a getting-into/out facility selection unit 180. The stopping difficulty level setting unit 172, the driving assistance level acquisition unit 174, the control unit 176, the recognition level setting unit 178, and the getting-into/out facility selection unit 180 correspond to the stopping difficulty level setting unit 520, the driving assistance level acquisition unit 530, the control unit 540, the recognition level setting unit 550, and the getting-into/out facility selection unit 560 of the first embodiment, respectively. Also, in the second embodiment, the first control unit 120 and the second control unit 160 are examples of a "guidance unit".

Figure 14:
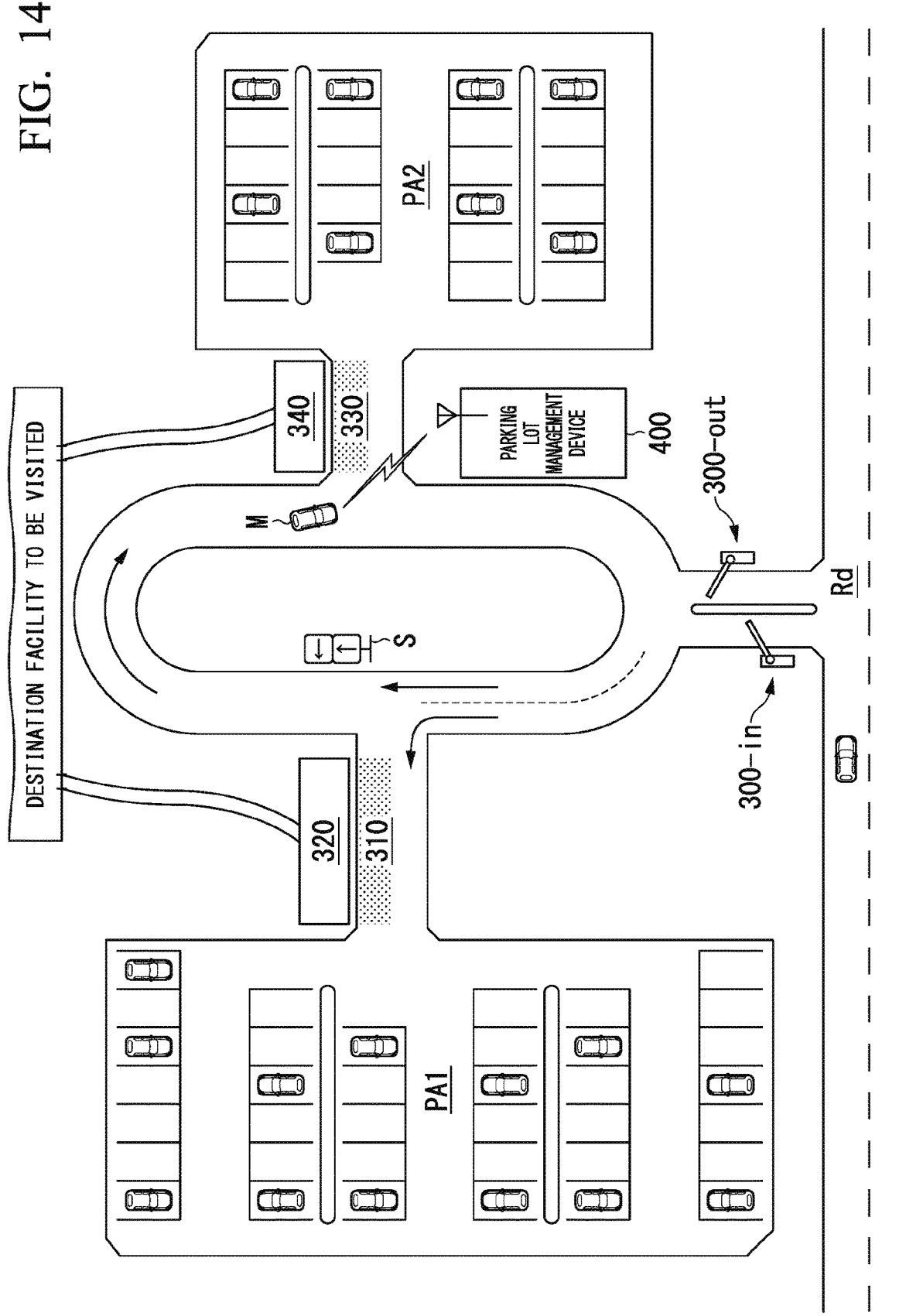
FIG. 14 is a diagram schematically showing a scene in which an autonomous parking event is executed according to the second embodiment.

FIG. 14 is a diagram schematically showing a scene in which the autonomous parking event is executed according to the second embodiment. A destination facility to be visited shown in FIG. 14 includes, for example, a parking lot PA1 mainly including a getting-into/out facility having a high stopping difficulty level (for example, a parallel getting-into/out facility) and a parking lot PA2 mainly including a getting-into/out facility having a low stopping difficulty level (for example, an independent getting-into/out facility).

Although the stopping area 310 and the getting-into/out area 320, which are the getting-into/out facilities of the parking lot PA1, mainly include parallel getting-into/out facilities, some getting-into/out facilities may include an independent getting-into/out facility.

For example, the getting-into/out facility selection unit 180 selects the parking lot PA1 for a vehicle having a recognition level higher than or equal to a reference level. Also, for example, the getting-into/out facility selection unit 560 selects the parking lot PA2 for a vehicle having a recognition level lower than the reference level.

Also, the stopping difficulty level setting unit 172 sets a stopping difficulty level of the stopping area 310 on the basis of a recognition result of the recognition unit 130 of the vehicle M received by the communication device 20 and the like. In this case, for example, the stopping difficulty level setting unit 172 sets a stopping difficulty level of the stopping area 310 by executing a stopping difficulty level determination module implemented by a function of an AI or a function of a model that is given in advance using a recognition result of the recognition unit 130 of the vehicle M received by the communication device 20 as input data.

The driving assistance level acquisition unit 174 may acquire an automated driving level of another vehicle that is likely to use a getting-into/out facility in the same time period as the vehicle M on the basis of an automated driving level of the vehicle M. In this case, the recognition level setting unit 178 sets a recognition level of each vehicle on the basis of automated driving levels of a plurality of vehicles acquired by the driving assistance level acquisition unit 174. The getting-into/out facility selection unit 180 positively selects the stopping area 310 (or the stopping area 330) in which the vehicle M can be stopped and which has a highest stopping difficulty level on the basis of processing results of the stopping difficulty level setting unit 172 and the recognition level setting unit 178.

Also, the driving assistance level acquisition unit 174 may receive an operation of the user of the vehicle M and set a recognition level of the vehicle M on the basis of an operation result thereof. For example, when the vehicle M is a vehicle that can autonomously travel at an automated driving level higher than or equal to a predetermined level, but is manually driven by the user of the vehicle M until the vehicle M passes through the gate 300-in, the user performs an operation of whether to switch driving to automated driving or whether to continue manual driving after the vehicle M passes through the gate 300-in via the HMI 30 or the like. The driving assistance level acquisition unit 174 acquires an operation result and sets a recognition level. Also, the parking lot management device 400 may have a function of requesting the vehicle M, which is being manually driven, to enter the parking lot according to automated driving in accordance with an empty state and a congestion state within the parking lot PA1 and the parking lot PA2. In response to the request, the autonomous parking control unit 142 sets an automated driving level of the vehicle M higher than or equal to a predetermined level and causes the vehicle M to travel autonomously.

[Selection of Parking Lot and Getting-Into/Out Facilities]

For example, when a predetermined distance from the destination facility to be visited or the gate 300-in has been reached (when the state is a state immediately before the vehicle enters the parking lot) or when communication with the parking lot management device 400 is possible, the communication device 20 receives information about the parking lot management device 400. The getting-into/out facility selection unit 180 selects the parking lot PA1 and the parking lot PA2 to be used by the vehicle M on the basis of an output result of the control unit 176 and a setting result of the recognition level setting unit 178. In the example shown in FIG. 14, the getting-into/out facility selection unit 560 selects whether the parking lot where the vehicle M stops is the parking lot PA1 or the parking lot PA2 and guides the vehicle M to a selected parking lot by displaying a selection result on the HMI 30 of the vehicle M or transmitting the selection result to a signal device S within the parking lot for guiding the vehicle M to a course.

Also, the getting-into/out facility selection unit 180 selects the stopping area 310 and the getting-into/out area 320 (or the stopping area 330 and the getting-into/out area 340) where the vehicle M is stopped from the getting-into/out facilities attached to the selected parking lot.

In this case, the stopping difficulty level setting unit 172 acquires information about a stopping difficulty level of the getting-into/out facility from the parking lot management device 400 or sets information about a stopping difficulty level of the getting-into/out facility on the basis of a recognition result of the recognition unit 130 of the vehicle M on its own. The getting-into/out facility selection unit 180 selects a getting-into/out facility where the vehicle M is stopped with reference to the stopping difficulty level set by the stopping difficulty level setting unit 172.

[In Case of Manual Driving Vehicle]

When the vehicle M is a vehicle that is being manually driven and an automated parking event is started after the user U of the vehicle M gets out of the getting-into/out facility, the getting-into/out facility selection unit 180 first selects to use the parking lot PA2. The vehicle M that is being manually driven first passes through the gate 300-in and the vehicle M is stopped in the stopping area 330 in accordance with a driving operation of the user U (a driver). The autonomous parking control unit 142 of the vehicle M allows the user U of the vehicle M to get out of the vehicle M and then causes the above-described autonomous parking event to be started.

Also, when the vehicle M is a vehicle that is being manually driven and does not perform automated driving and traveling including parking, the getting-into/out facility selection unit 180 selects the parking lot PA2. The user U (the driver) of the vehicle M that is being driven manually first passes through the gate 300-in and goes to the parking lot PA2. At this time, the user U of the vehicle M that is being driven manually may cause the vehicle M to be stopped in the stopping area 330 on the way to the parking lot PA2 and may allow a user (a passenger) other than the driver of the vehicle M to get out of the vehicle M. The user U of the vehicle M may select one of parking spaces PS of the parking lot PA2 on his or her own and park the vehicle M in the selected parking space PS or may park the vehicle M in a parking space PS designated by the parking lot management device 400.

When the vehicle M leaves, the user U of the vehicle M selects whether to perform manual driving or whether to move the vehicle M to the getting-into/out facility according to the autonomous parking event as in the above-described leaving process. The getting-into/out facility selection unit 180 selects the getting-into/out facility in accordance with a result of selecting whether or not the user U is performing the manual driving. When the user U of the vehicle M is performing manual driving and uses the getting-into/out facility, the getting-into/out facility selection unit 180 selects the getting-into/out facility having a lower stopping difficulty level such as an independent getting-into/out facility and guides the vehicle M thereto.

[In Case of Automated Driving Vehicle]

Also, when the vehicle M stops at a destination facility to be visited in a state in which the vehicle M is autonomously traveling (for example, in a state in which the automated driving level is higher than or equal to a predetermined level), the getting-into/out facility selection unit 180 may more flexibly apply whether the vehicle M parks in the parking lot PA1 or the parking lot PA2. For example, when the parking lot PA1 is in a full state, the autonomous parking control unit 142 causes the vehicle M to move to the parking lot PA2 through the passage of the parking lot PA1 and park in the parking lot PA2 after allowing the user U to get out of the vehicle M in the stopping area 310 and the getting-into/out area 320.

When the vehicle M leaves, the getting-into/out facility selection unit 180 selects a getting-into/out facility and allows the user U to get into the vehicle M therein as in the above-described entering process.

Although a case in which the parallel getting-into/out facility has a higher stopping difficulty level than the independent getting-into/out facility has been described in the above-described example, adjustment may be performed so that the parallel getting-into/out facility has the same stopping difficulty level as the independent getting-into/out facility. For example, when a length L(D) of an extra space between the stopping areas shown in FIG. 6 can be secured to be approximately the same as a vehicle length of the vehicle M (i.e., approximately the same as the length L(M)) or longer, the stopping difficulty level setting unit 172 may set stopping difficulty levels of the stopping areas 310-1 to 310-3 so that they have approximately the same stopping difficulty level as the independent getting-into/out facility.

[Process Flow 4]

Figure 15:
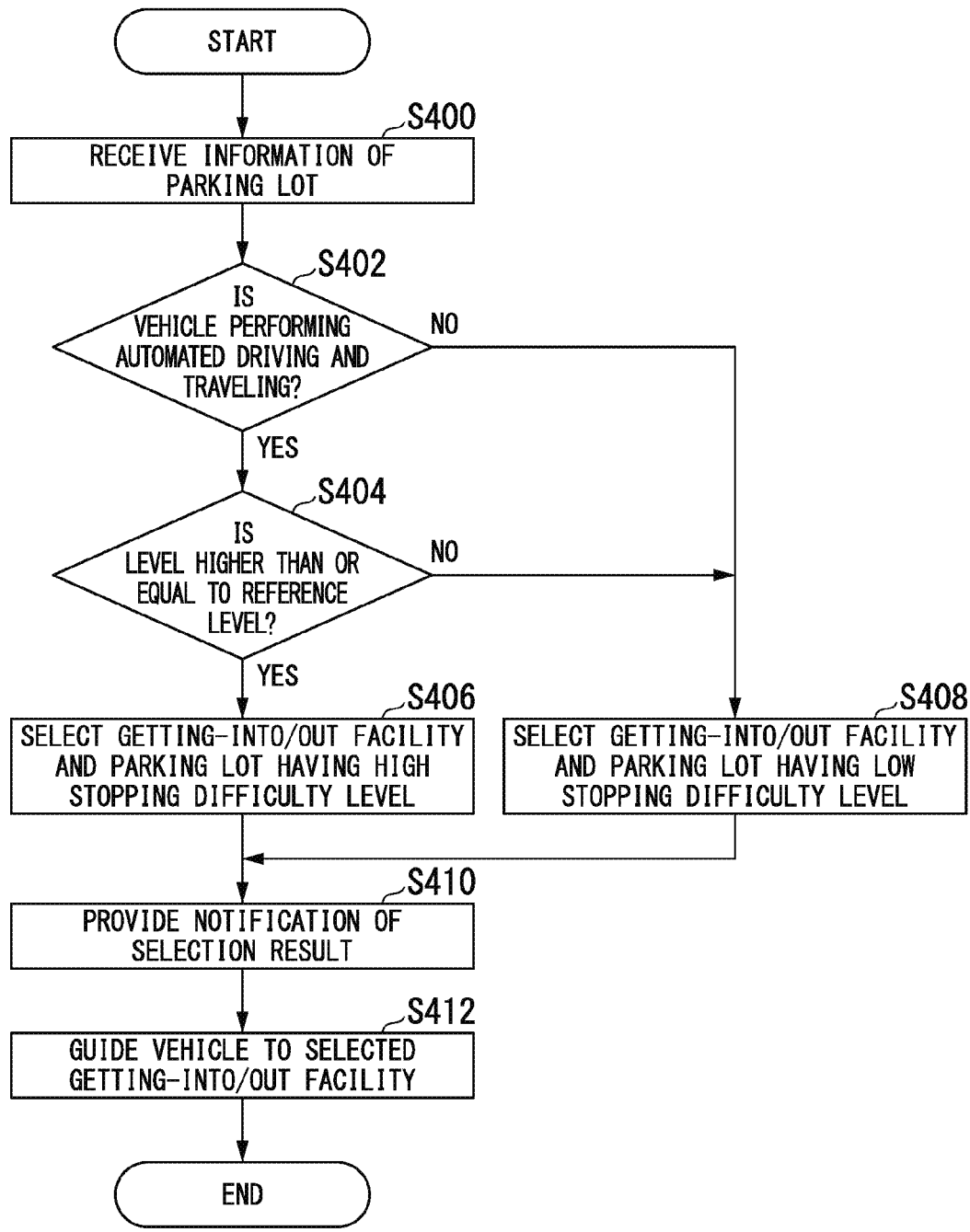
FIG. 15 is a flowchart showing an example of a flow of an entering/leaving process of the vehicle system 1A.

FIG. 15 is a flowchart showing an example of a flow of an entering process of the vehicle system 1A.

First, the communication unit 510 receives information about the parking lot PA1 and the parking lot PA2 (step S400). Next, the getting-into/out facility selection unit 560 determines whether or not the host vehicle is performing automated driving and traveling (step S402).

When the vehicle is performing automated driving and traveling, the getting-into/out facility selection unit 560 determines whether or not the recognition level of the vehicle M is higher than or equal to the reference level (step S404). When the recognition level of the vehicle M is lower than the reference level, the process proceeds to step S408. When the recognition level of the vehicle M is higher than or equal to the reference level, the use of getting-into/out facilities (i.e., the stopping area 310 and the getting-into/out area 320 in FIG. 12) and the parking lot PA1 with a high stopping difficulty level is selected (step S406) and the process proceeds to step S410 to be described below. When the vehicle M is not performing automated driving and traveling, the use of getting-into/out facilities (i.e., the stopping area 330 and the getting-into/out area 340 in FIG. 12) and the parking lot PA2 with a low stopping difficulty level is selected (step S408) and the process proceeds to step S410 to be described below.

After the processing of step S402 or step S406, the communication unit 510 notifies the parking lot management device 400 of a selection result of the getting-into/out facility selection unit 560 (step S410). Next, the guidance unit 570 guides the vehicle M to go toward the getting-into/out facility selected by the getting-into/out facility selection unit 560 (step S412). Accordingly, the description of the process of the present flowchart ends.

The flow of the process of the vehicle system 1A in the leaving process is similar to that of the flowchart shown in FIG. 15 (however, a process of selecting the parking lot PA1 or the parking lot PA2 in steps S406 and S408 is not performed).

As described above, the third control unit 170 of the second embodiment can mitigate the congestion of the getting-into/out facility by performing more suitable selection in accordance with usage situations of a plurality of getting-into/out facilities and a plurality of parking lots even though the vehicle M is not a vehicle that performs an autonomous parking event (i.e., the vehicle M is a manually driven vehicle) in addition to effects similar to those of the first embodiment.

[Hardware Configuration]

Figure 16:
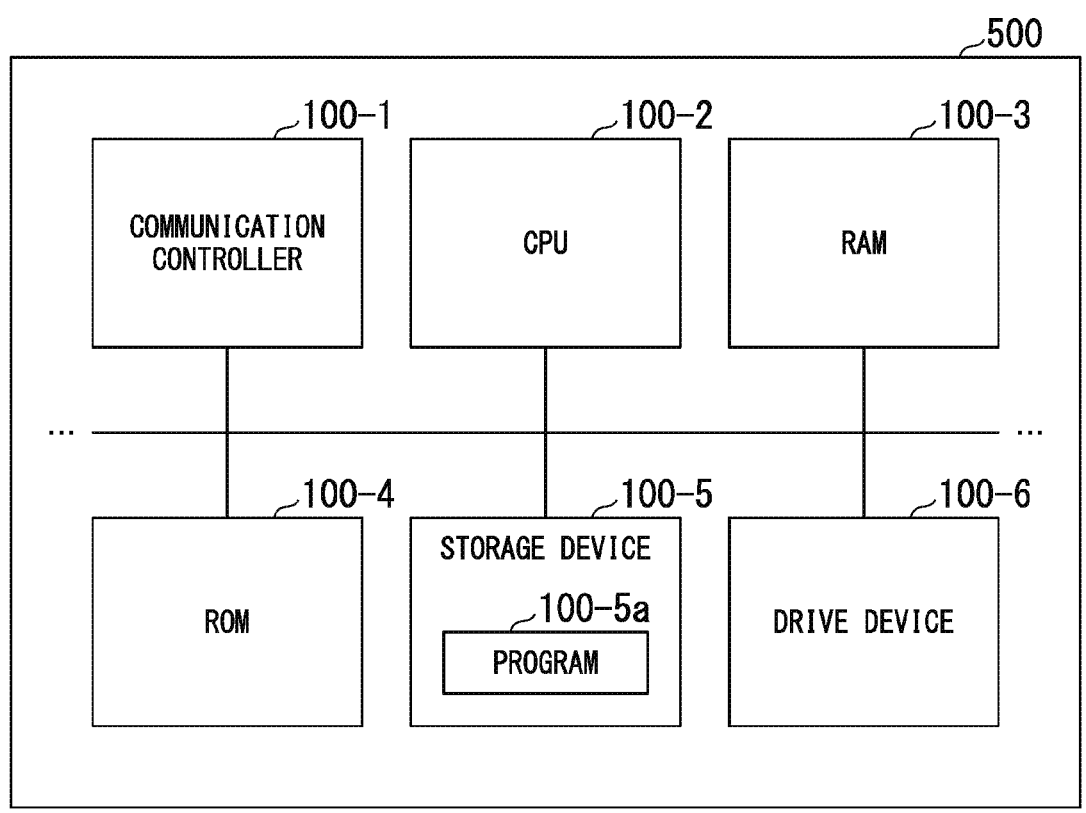
FIG. 16 is a diagram showing an example of a hardware configuration of a parking lot management device 400 according to the embodiment.

FIG. 16 is a diagram showing an example of a hardware configuration of the control device 500 according to the embodiment. As shown in FIG. 16, the control device 500 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an HDD, a drive device 100-6, and the like are mutually connected by an internal bus or a dedicated communication line. The communication controller 100-1 communicates with components other than the control device 500. The storage device 100-5 stores a program 100-5a to be executed by the CPU 100-2. This program is loaded into the RAM 100-3 by a direct memory access (DMA) controller (not shown) or the like and executed by the CPU 100-2. Thereby, a part or all of the control device 500 is implemented.

The hardware configuration described above can also be applied as an example of the hardware configuration of the parking lot management device 400 of the embodiment. In this case, a computer of the parking lot management device 400 has a configuration in which the communication controller 100-1, the CPU 100-2, the RAM 100-3 used as a working memory, the ROM 100-4 storing a boot program and the like, the storage device 100-5 such as a flash memory or an HDD, the drive device 100-6, and the like are mutually connected by an internal bus or a dedicated communication line. Thereby, some or all of the components of the parking lot management device 400 are implemented.

The hardware configuration described above can also be applied as an example of the hardware configuration of the automated driving control device 100 according to the embodiment. In this case, the computer of the automated driving control device 100 has a configuration in which the communication controller 100-1, the CPU 100-2, the RAM 100-3 used as a working memory, the ROM 100-4 storing a boot program and the like, the storage device 100-5 such as a flash memory or an HDD, the drive device 100-6, and the like are mutually connected by an internal bus or a dedicated communication line. Thereby, some or all of the first control unit 120, the second control unit 160, and the third control unit 170 are implemented.

The embodiment described above can be represented as follows.

A control device including:

a storage device storing a program; and a hardware processor, wherein the hardware processor executes the program stored in the storage device to:

select one or more getting-into/out facilities where a vehicle to be parked in a parking lot will stop from among a plurality of getting-into/out facilities on the basis of at least information indicating a driving assistance level at which driving assistance can be executed by the vehicle and information associated with the parking lot having the plurality of getting-into/out facilities in response to a leaving request for causing the vehicle to automatedly move from a parking position to the getting-into/out facility; and guide the vehicle to the selected getting-into/out facility.

Although modes for carrying out the present invention have been described using embodiments, the present invention is not limited to the embodiments, and various modifications and substitutions can also be made without departing from the scope and spirit of the present invention.

What is claimed is:

1. A control device comprising:
a getting-into/out facility selection unit configured to select one or more getting-into/out facilities where a vehicle to be parked in a parking lot will stop from among a plurality of getting-into/out facilities on the basis of at least information indicating an automated driving level that can be executed by the vehicle and information associated with the parking lot having the plurality of getting-into/out facilities; and
a guidance unit configured to guide the vehicle to the selected getting-into/out facility
wherein the automated driving level is based on a time period required for the vehicle to complete parallel parking, and wherein the automated driving level is higher as the time period is lower; and
wherein each of the plurality of getting-into/out facilities is set to have a respective stopping difficulty level, wherein the respective stopping difficulty level is defined according to a predicted time period required for the vehicle to stop in the getting-into/out facility, and wherein the respective stopping difficulty level is higher as the predicted time period is higher.

2. The control device according to claim 1, wherein the getting-into/out facility selection unit selects the getting-into/out facility in response to a leaving request for causing the vehicle to automatedly move from a stop position of the vehicle to the getting-into/out facility.

3. The control device according to claim 1, wherein the getting-into/out facility selection unit selects the getting-into/out facility when the vehicle is allowed to enter the parking lot.

4. The control device according to claim 3, wherein the getting-into/out facility selection unit is capable of selecting a getting-into/out facility having a higher stopping difficulty level when the automated driving level is higher.

5. The control device according to claim 3, wherein the getting-into/out facility selection unit selects a getting-into/out facility having a higher stopping difficulty level when the automated driving level is higher than or equal to a predetermined level than when the automated driving level is lower than the predetermined level.

6. The control device according to claim 3, further comprising a recognition level setting unit configured to set a recognition level representing a recognition accuracy level of the vehicle,
wherein the getting-into/out facility selection unit selects a getting-into/out facility having a higher stopping difficulty level than the getting-into/out facility selected in a situation in which the recognition level of the vehicle is lower than a first level when the recognition level of the vehicle is higher than or equal to the first level and lower than a second level higher than the first level, and
wherein the getting-into/out facility selection unit selects a getting-into/out facility having a higher stopping difficulty level than the getting-into/out facility selected in a situation in which the recognition level of the vehicle is higher than or equal to the first level and lower than the second level when the recognition level of the vehicle is higher than or equal to the second level.

7. The control device according to claim 6,
wherein the recognition level setting unit sets the recognition level on the basis of a level at which the vehicle can autonomously travel without accompanying a driving operation of a user of the vehicle, and
wherein the getting-into/out facility selection unit selects the getting-into/out facility on the basis of the recognition level set on the basis of the level at which the vehicle can autonomously travel.

8. The control device according to claim 4, wherein the getting-into/out facility selection unit sets the stopping difficulty level in accordance with an extra space in a vehicle length direction required when the vehicle is parallel parked in the selected getting-into/out facility and selects the getting-into/out facility on the basis of the set stopping difficulty level.

9. The control device according to claim 1, further comprising a stopping difficulty level setting unit configured to set information associated with a stopping difficulty level of the getting-into/out facility,
wherein the getting-into/out facility selection unit selects the getting-into/out facility where a host vehicle can stop and which has a higher stopping difficulty level from among the getting-into/out facilities in an empty state on the basis of a setting result of the stopping difficulty level setting unit and a recognition level representing a recognition accuracy level of the host vehicle.

10. A control method comprising:
selecting, by a computer, one or more getting-into/out facilities where a vehicle to be parked in a parking lot will stop from among a plurality of getting-into/out facilities on the basis of at least information indicating an automated driving level that can be executed by the vehicle and information associated with the parking lot having the plurality of getting-into/out facilities in response to a leaving request for causing the vehicle to automatedly move from a parking position to the getting-into/out facility; and
guiding, by the computer, the vehicle to the selected getting-into/out facility
wherein the automated driving level is based on a time period required for the vehicle to complete parallel parking, and wherein the automated driving level is higher as the time period is lower; and
wherein each of the plurality of getting-into/out facilities is set to have a respective stopping difficulty level, wherein the respective stopping difficulty level is defined according to a predicted time period required for the vehicle to stop in the getting-into/out facility, and wherein the respective stopping difficulty level is higher as the predicted time period is higher.

11. A computer-readable non-transitory storage medium storing a program for causing a computer to:
select one or more getting-into/out facilities where a vehicle to be parked in a parking lot will stop from among a plurality of getting-into/out facilities on the basis of at least information indicating an automated driving level that can be executed by the vehicle and information associated with the parking lot having the plurality of getting-into/out facilities in response to a leaving request for requesting the vehicle to automatedly move from a parking position to the getting-into/out facility; and guide the vehicle to the selected getting-into/out facility wherein the automated driving level is based on a time period required for the vehicle to complete parallel parking, and wherein the automated driving level is higher as the time period is lower; and wherein each of the plurality of getting-into/out facilities is set to have a respective stopping difficulty level, wherein the respective stopping difficulty level is defined according to a predicted time period required for the vehicle to stop in the getting-into/out facility, and wherein the respective stopping difficulty level is higher as the predicted time period is higher.

* * * * *